US008392020B2

(12) United States Patent
Terzini

(10) Patent No.: US 8,392,020 B2
(45) Date of Patent: Mar. 5, 2013

(54) AUTOMATED PRECISION SMALL OBJECT COUNTING AND DISPENSING SYSTEM AND METHOD

(75) Inventor: Robert Terzini, Corinth, TX (US)

(73) Assignee: Tension International, Inc., Kansas City, MO (US)

( * ) Notice: Subject to any disclaimer, the term of this patent is extended or adjusted under 35 U.S.C. 154(b) by 603 days.

(21) Appl. No.: 12/396,417

(22) Filed: Mar. 2, 2009

(65) Prior Publication Data

US 2009/0218363 A1 Sep. 3, 2009

Related U.S. Application Data

(60) Provisional application No. 61/067,533, filed on Feb. 29, 2008.

(51) Int. Cl.
*G06F 17/00* (2006.01)
*B65D 83/04* (2006.01)

(52) U.S. Cl. ......... 700/243; 700/236; 700/242; 700/232

(58) Field of Classification Search ........... 700/231–244
See application file for complete search history.

(56) References Cited

U.S. PATENT DOCUMENTS

| | | | | |
|---|---|---|---|---|
| 3,823,844 | A | 7/1974 | Linkemer et al. | |
| 3,871,156 | A | 3/1975 | Koenig et al. | |
| 5,671,262 | A * | 9/1997 | Boyer et al. | 377/11 |
| 5,671,592 | A | 9/1997 | Yuyama et al. | |
| 6,053,302 | A * | 4/2000 | Leu et al. | 198/471.1 |
| 6,161,721 | A * | 12/2000 | Kudera et al. | 221/9 |
| 6,263,259 | B1 * | 7/2001 | Bartur | 700/240 |
| 6,561,377 | B1 * | 5/2003 | Pearson et al. | 221/7 |
| 6,611,733 | B1 | 8/2003 | De la Huerga | |
| 6,775,589 | B2 | 8/2004 | William et al. | |
| 7,014,063 | B2 * | 3/2006 | Shows et al. | 221/211 |
| 7,139,639 | B2 * | 11/2006 | Broussard et al. | 700/225 |
| 7,228,198 | B2 * | 6/2007 | Vollm et al. | 700/235 |
| 7,255,247 | B2 | 8/2007 | Aylward | |
| 7,263,411 | B2 * | 8/2007 | Shows et al. | 700/237 |
| 7,726,514 | B2 * | 6/2010 | Janet et al. | 221/221 |
| 8,020,724 | B2 * | 9/2011 | Remis et al. | 221/211 |
| 2003/0183642 | A1 | 10/2003 | Kempker | |
| 2006/0167586 | A1 | 7/2006 | Kobayashi et al. | |
| 2008/0041872 | A1 | 2/2008 | Shows et al. | |
| 2008/0140252 | A1 | 6/2008 | Handfield et al. | |
| 2008/0288105 | A1 | 11/2008 | Mauger et al. | |

FOREIGN PATENT DOCUMENTS

| | | | |
|---|---|---|---|
| WO | WO-2005-060917 | A1 | 7/2005 |
| WO | WO-2007-124406 | A3 | 11/2007 |
| WO | WO-2008-003759 | A3 | 6/2008 |

* cited by examiner

*Primary Examiner* — Michael K Collins
(74) *Attorney, Agent, or Firm* — Polsinelli Shughart PC

(57) ABSTRACT

A small object dispenser adapted to receive a canister of objects such as pills, the canister being coupled atop it through a secure, bar-code matched gate operated by a central controller. A hopper below the gate directs smaller quantities of objects into a charge block adapted to measure out a select number of objects into an angularly disposed, circular counter where they accumulate atop a movable plate forming the bottom of the counter. The plate bears slots around its perimeter adjacent the cylindrical walls of the counter. As the central controller operates a servo motor to rotate the plate in measured increments, it urges a precise count of objects from the bottom of the counter to a port through which they fall one at a time into a receptacle such as a prescription bottle. Orientation means on the interior of the walls orient objects so that only a single object may fall into each slot, thereby preventing overfilling. A separate sensor counts the objects as they fall to verify quantity and guard against underfilling due to empty slots.

10 Claims, 20 Drawing Sheets

AUTOMATED PRECISION SMALL OBJECT COUNTING AND DISPENSING SYSTEM AND METHOD

CROSS REFERENCE TO RELATED APPLICATIONS

This application claims priority under 35 U.S.C. 119(e) and 37 C.F.R. 1.78(a)(4) based upon U.S. Provisional Application, Ser. No. 61/067,533 for AUTOMATED PRECISION SMALL OBJECT COUNTING AND DISPENSING SYSTEM AND METHOD filed Feb. 29, 2008, the entirety of which application is incorporated herein by reference.

BACKGROUND OF THE INVENTION

1. Field of the Invention

This invention relates generally to automated small object counting and dispensing systems and particularly to prescription filling systems. More particularly, this invention relates to such a system having automated pill and capsule counting apparatus and a bulk pill and capsule security, matching and verification system.

2. Description of Related Art

With increasing demand for orally administered medicine in recent years, automated prescription filling systems have come into their own worldwide. Such systems draw from bulk canisters of pills to count out exact quantities for smaller containers individualized to particular patients. Aside from the need to track through such systems the particular bottle to be associated with said patient, accurate counting systems are required to assure that neither too many nor too few pills are dispensed into the bottle.

Many systems rely upon optical sensors to count pills as they drop into a bottle stationed below the canister. Accuracy of optical sensors, however, may be handicapped in several ways. First, pills falling through the space where the sensor is focused may stick together or otherwise group to mislead the sensor into thinking only a single pill fell when in fact more than one did. Further, should too many pills fall into the dispenser, nothing short of dumping the pills and starting over with the filling process will assure an accurate count. Means for precise counting of pills in advance of their being committed to a bottle would bring a desirable measure of precision to the dispensing problem.

SUMMARY OF THE INVENTION

Accordingly, it is an object of this invention to provide a pill dispenser that precisely counts small objects to be dispensed into individualized containers.

It is another object of this invention to provide a dispenser that does not rely solely upon optical sensors for pill counts.

It is yet another object of this invention to provide a dispenser that can be stopped and started in response to cumulative counts, obviating any need to dump and restart a filling operation because of inaccuracy.

It is yet another object of this invention to provide secure means for matching bulk canisters of small objects to the proper dispenser to prevent mistakes in filling containers with the wrong objects.

It is yet another object of this invention to provide a mechanical cylinder and wheel dispenser that assures only a single object is counted.

It is yet another object of this invention to provide the foregoing for assuring the accuracy and security of pharmaceutical dispensing and prescription filling operations. NOTE: hereinafter, the invention will be discussed in the context of a pharmaceutical dispensing apparatus.

The foregoing and other objects of this invention are achieved by providing a small object dispenser adapted to receive a canister of objects such as pills, the canister being coupled atop it through a secure, bar-code matched gate operated by a central controller. A hopper below the gate directs smaller quantities of objects into a charge block adapted to measure out a select number of objects into an angularly disposed, circular counter where they accumulate atop a movable plate forming the bottom of the counter. The plate bears slots around its perimeter adjacent the cylindrical walls of the counter. As the central controller operates a servo motor to rotate the plate in measured increments, it urges a precise count of objects from the bottom of the counter to a port through which they fall one at a time into a receptacle such as a prescription bottle. Orientation means on the interior of the walls orient objects so that only a single object may fall into each slot, thereby preventing overfilling. A separate sensor counts the objects as they fall to verify quantity and guard against underfilling due to empty slots.

BRIEF DESCRIPTION OF THE DRAWINGS

The novel features believed characteristic of the present invention may be set forth in appended claims. The invention itself, however, as well as a preferred mode of use and further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
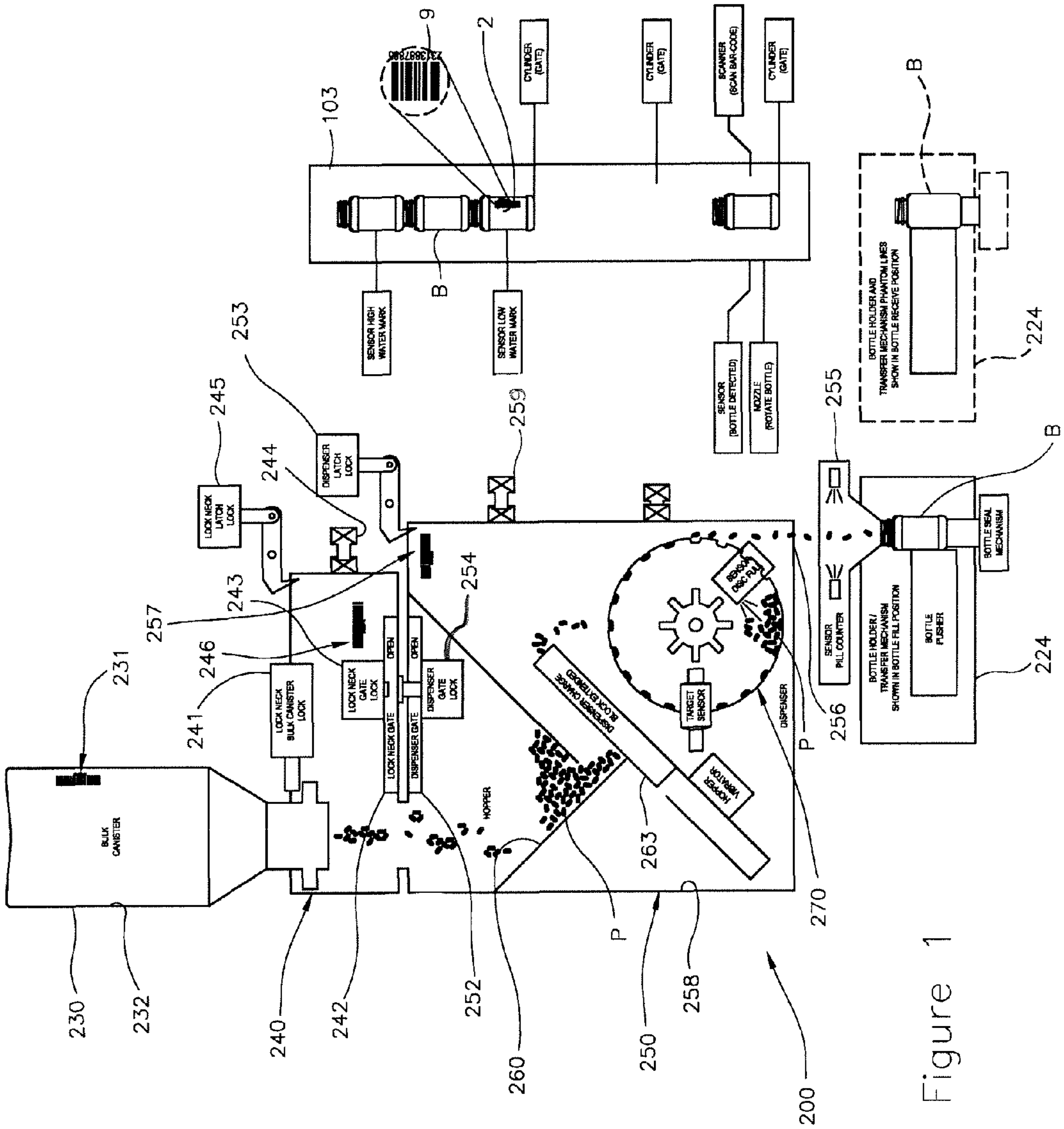
FIG. 1 shows in a schematic of a bottle filling dispenser component of the present invention with a bulk canister bottle attached.
Figure 2B:
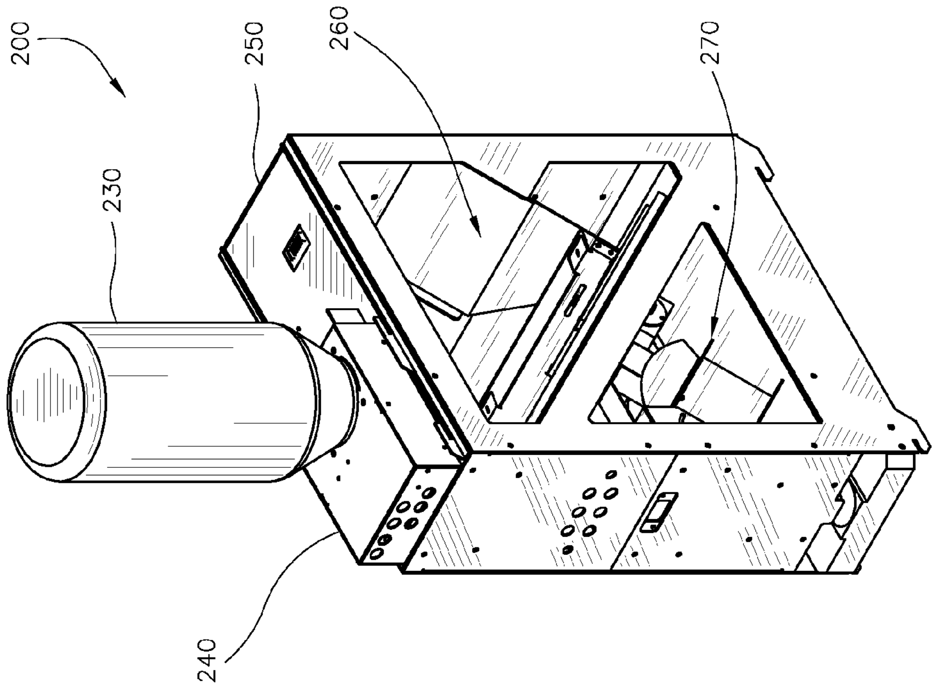
FIGS. 2A and 2B show diametrically opposite perspective views of the dispenser component of FIG. 1
Figure 2A:
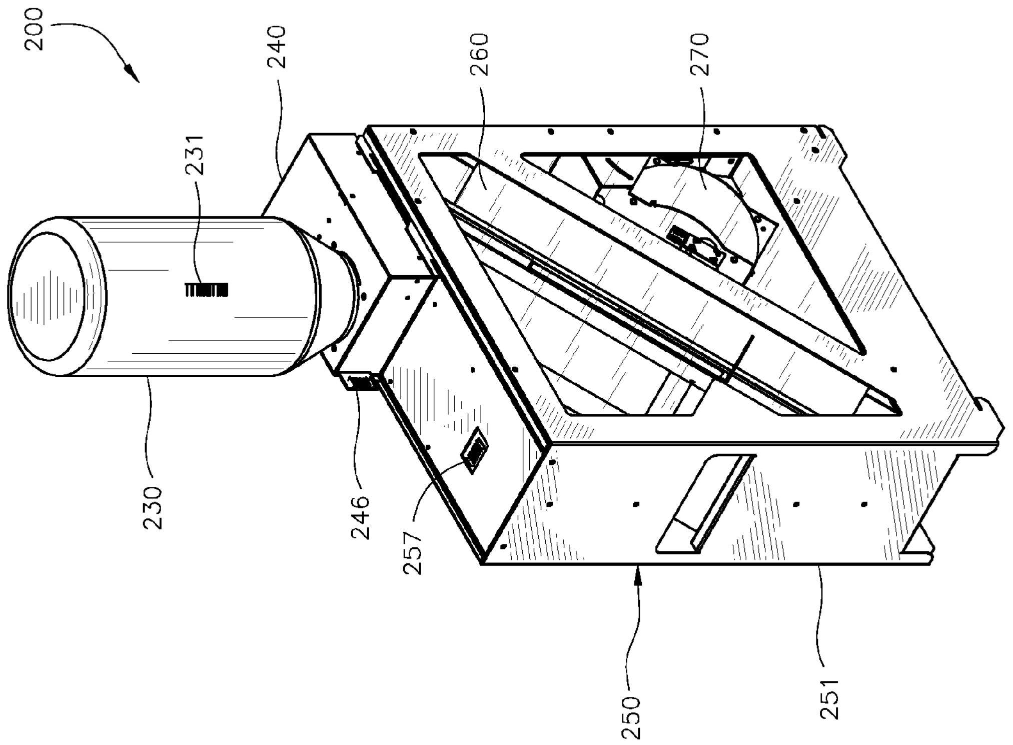

With reference now to the figures, and in particular to FIGS. 1-4, a single dispenser unit 200 integrates with bottle train BT to dispense objects, namely pills P, into bottles B in measured quantities according to a predetermined requirements (individual prescriptions). NOTE: as mentioned above, the present invention, though adaptable for the counting and dispensing of myriad small objects, will be discussed hereinafter in this disclosure primarily in the context of pharmaceuticals and prescription filling, except where special notice is needed for other objects. One having ordinary skill in the art will recognize that the counting and dispensing of any such small objects is considered to be within the spirit and scope of the present invention.

Dispenser unit 200 comprises chassis 250 coupled to bulk canister 230 through lock neck 240 and containing within its interior 258 hopper system 260 and counter 270 adapted to accumulate pills P from bulk canister 230 for counting and dispensing into bottles B. Though not shown in the figures, each dispenser 200 includes a self-contained cabinet or chassis 250 having isolating side walls (see FIGS. 2A, 2B) to prevent such cross-contamination during simultaneous operation as well. Disposed atop chassis 250 within a closable window, bar code 257 provides means for uniquely identifying dispenser unit 200 for associating it with canister 230 containing pills P, as discussed in more detail below.

Dispensers 200 may be used singly as described below to fill small volumes of prescriptions from first one and then another of various canisters 230, with proper cleaning in-between canister 230 changes to deter cross-contamination between different types of pills P. Preferably, however, a plurality of dispensers 200 will be arrayed in close proximity one to another, each dispenser 200 having a pre-assigned and identified docking station (not shown) on bottle train BT, to enable selective direction of multiple bottles B, each possibly requiring different prescriptions, to the proper dispenser 200. Upon docking chassis 250 to bottle train BT at a given docking station (not shown) controller C associates its bar code 257 with a location identifier (not shown) for said docking station so that controller C thenceforth knows which bottles B to assign to such location for filling with pills P from a particular canister 230 coupled thereto, as discussed in more detail below.

Bottle train BT provides the means of sequentially positioning bottles B one at a time beneath outfall 256 of each dispenser 200. Preferably, for use with the present invention, bottle train BT comprises a system of pneumatic tubes 103 which couple supplies of bottles B through labeling apparatus (not shown) to one of a plurality of dispensing units 200. The particular dispenser unit 200 to which bottle B is directed by bottle train BT is selected to match the pill P contents thereof with the requirements of the prescription for which bottle B has been entrained in bottle train BT. Label 2 borne on bottle B further bears bar code 9 uniquely identifying bottle B for use and tracking by controller C (discussed below) which manages bottle train BT and dispenser units 200 to fill multiple prescriptions according to the present invention.

Figure 4A:
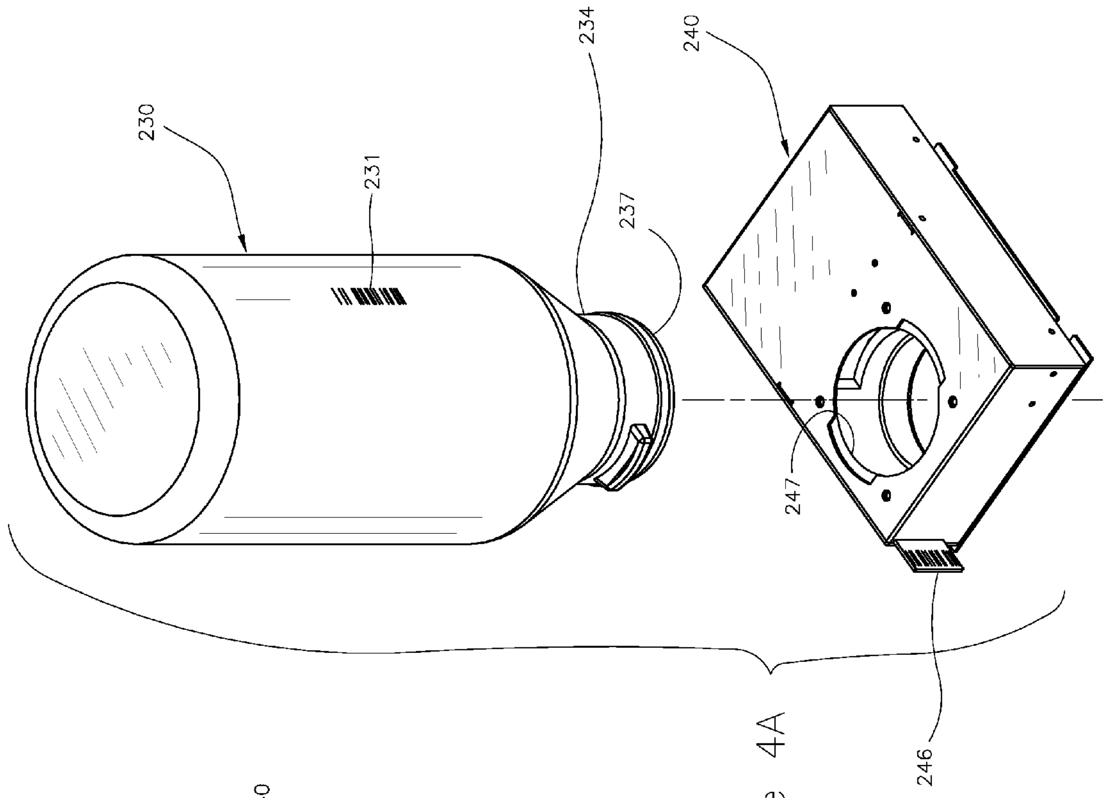
FIGS. 4A, 4B depict the bulk canister and a lock neck device through which it interfaces with the dispenser of FIG. 1.
Figure 4B:
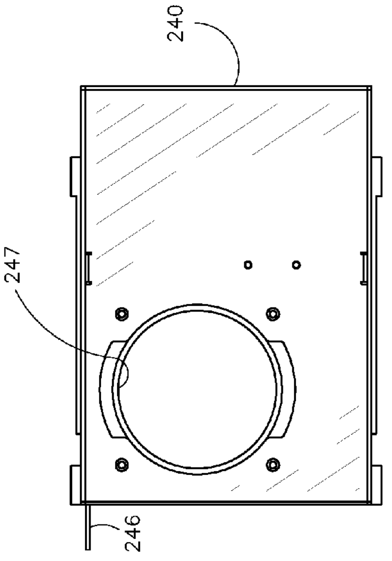

As best seen in FIG. 1, controller C (not shown) stages a plurality of bottles B in tube 103 of bottle train BT awaiting insertion by bottle holder 224 into filling position beneath dispenser 200. Bottle holder 224 further preferably comprises bottle grasping means and pneumatic actuator means which laterally translates each bottle B from bottle train BT into filing position, then retracts it once filled for further conveying to capping, content verification, packaging and shipping stages (none shown) in a full service prescription filling system (not shown). Alternately, bottle train BT may comprise a much simpler system for sequentially positioning bottles B beneath dispenser 200, such as that shown in U.S. Pat. No. 6,561,377 (FIG. 4). One having ordinary skill in the art will recognize that all means of entraining bottles B for sequentially positioning them beneath dispenser 200 for filling, including manual positioning, are considered to be within the spirit and scope of the present invention.

As discussed in more detail below, bulk canister 230 provides a standardized pill P reservoir for coupling to chassis 250. Pharmacists (not shown) load pills P from various manufacturers' proprietary containers (not shown) of myriad sizes and shapes into standardized canisters 230 for use with the present invention. Canisters 230 preferably are considerably larger than most such proprietary containers and are manufactured specifically to interface with dispenser unit 200 as discussed below. One having ordinary skill in the art will recognize, of course, that operators of the present invention having sufficient market power or willing to pay for such may have manufacturers provide pills P originally in containers which interface with the present invention without requiring this pre-loading step. Alternately, canisters 230 could comprise a variety of shapes and sizes defined by said manufacturers' proprietary containers, each having a lock neck 240 system dedicated thereto for use with dispensers 250.

Figure 3A:
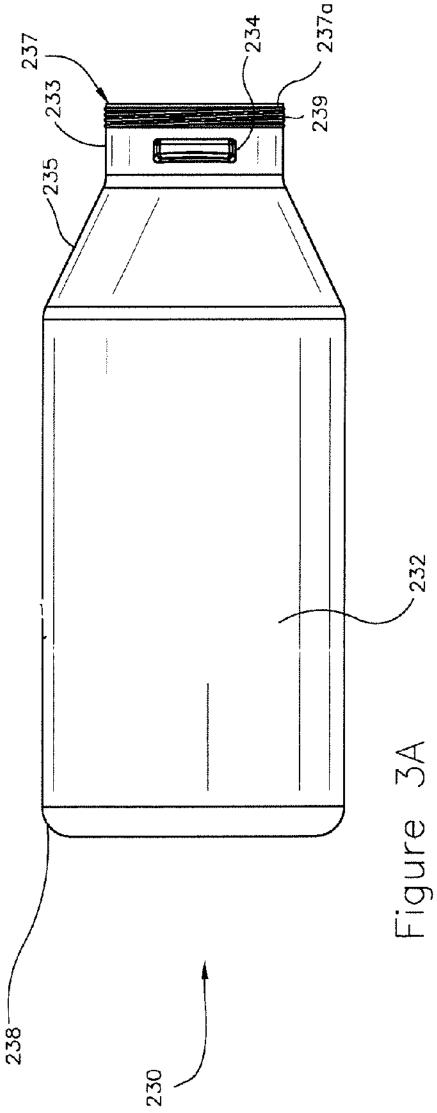
FIG. 3A-3C depicts in side, top end and top views respectively a bulk canister used with the dispenser of FIG. 1
Figure 3C:
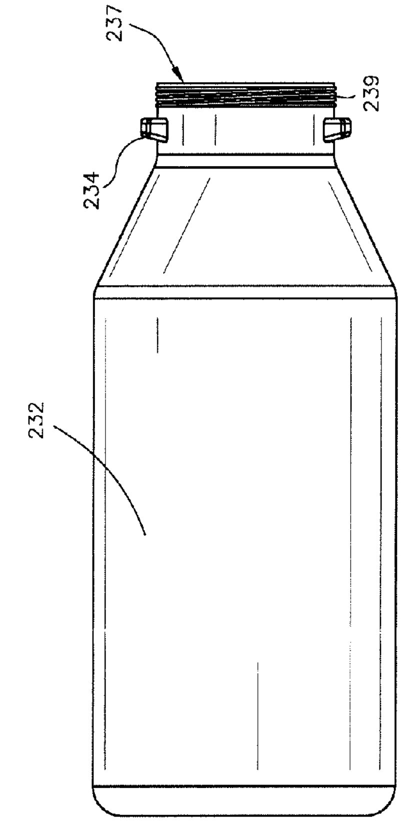
Figure 3B:
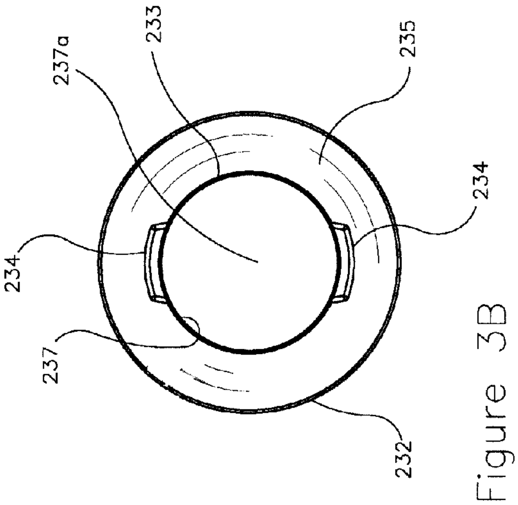

With particular reference now to FIGS. 3A-3C, canister 230 comprises substantially cylindrical chamber 232 closed at substantially flat bottom end 238 adapted to support canister 230 upright for storage and transportation. Canister 230 tapers through shoulder 235 to neck 233 and terminates in mouth 237 opposite bottom 238. Chamber 232 is depicted in the figures as being substantially circular in cross section as are most bottles, but one having ordinary skill in the art will recognize that bulk canister 230 could comprise other convenient and conventional shapes, such as ones having a rectangular cross section (not shown), without departing from the spirit and scope of the present invention.

Neck 233 bears threads 239 adapted to cooperate with matching threads on a cap (not shown) serving as mechanical closure means for canister 230. Such mechanical closure means allows multiple canisters 230 to be stacked one atop another for storage. One having ordinary skill in the art will recognize that other conventional or proprietary mechanical closure means, such as a resilient snap-on cap, or a surrounding box, could be utilized in like manner to provide mechanical closure for canister 230 without departing from the spirit and scope of the present invention. Spaced around the outer perimeter of neck 233 and disposed adjacent threads 239 opposite mouth 237, neck lugs 234 are adapted to interface with lock neck 240 to removably affix canister 230 thereto, as discussed in more detail below.

Spanning mouth 237, sealing means 237A seals chamber 232 until it is manually removed just prior to canister 230 being coupled to lock neck 240, which then takes its place as secure sealing means for canister 230. Sealing means 237A comprises a membrane of conventional composition induction sealed to the perimeter of mouth 237 by known means. Sealing means 237A, thereby makes it tamper evident if canister 230 has been compromised since filling by the pharmacists or the manufacturer. One having ordinary skill in the art will recognize that sealing means 237A could comprise any of several other methods known in the art for tamper-evident sealing of canister 230, such as shrink-wrapping the cap with plastic, without departing from the spirit and scope of the present invention.

Figure 5A:
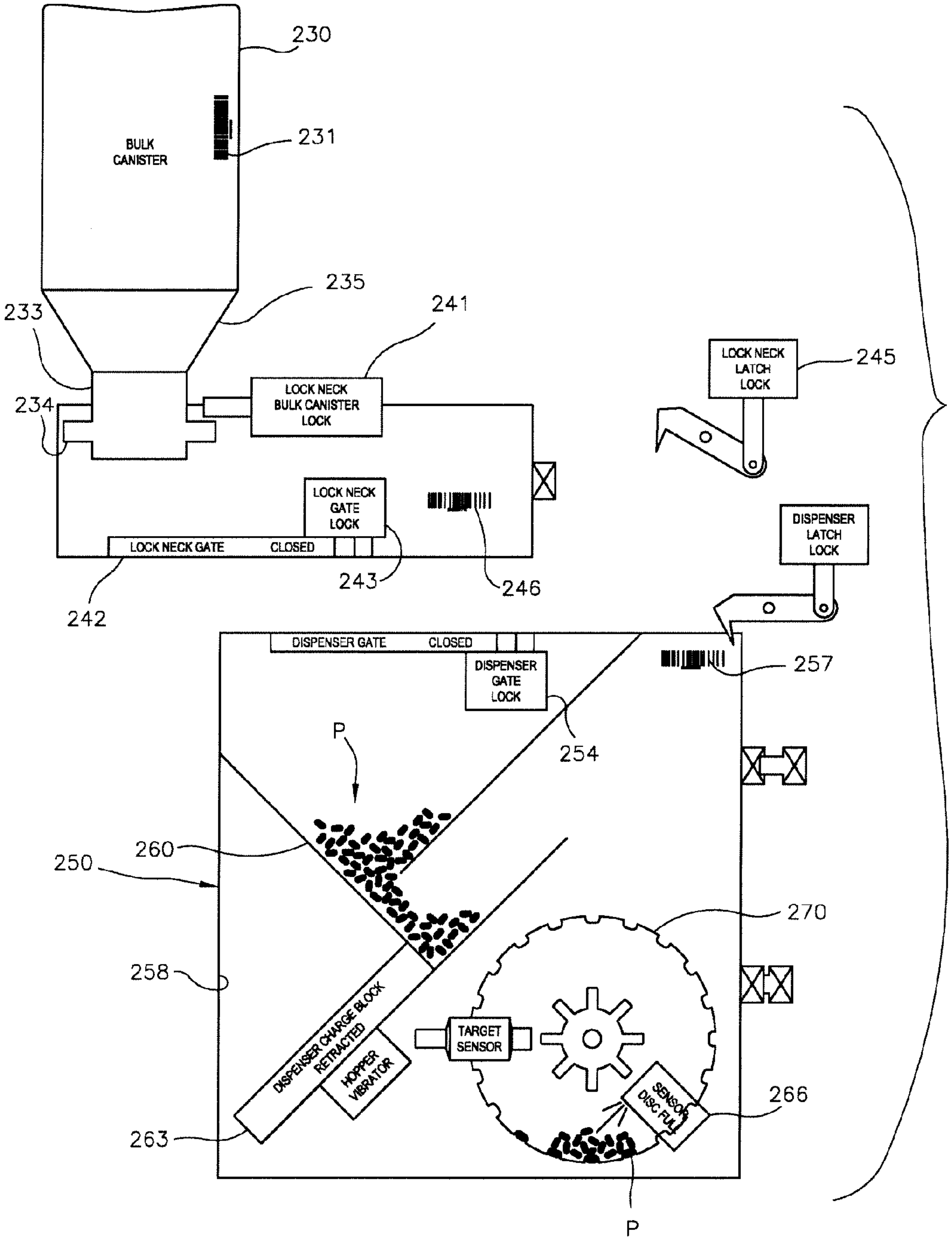
FIGS. 5A and 5B show the steps in attaching the bulk canister and lock neck devices of FIGS. 2A-4B to the dispenser of FIG. 1.
Figure 5C:
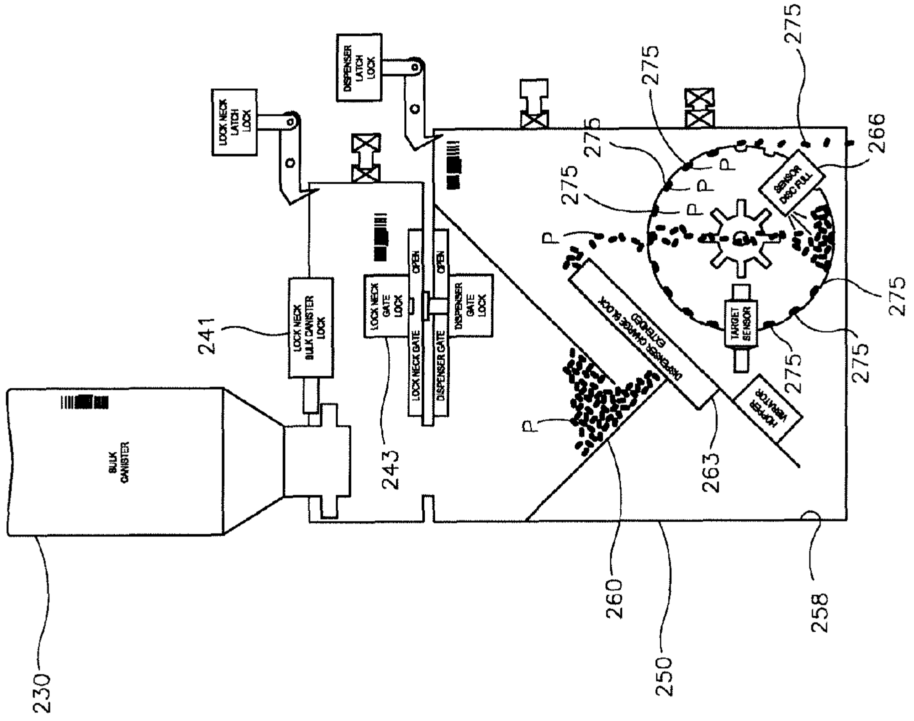
FIG. 5C depicts the dispenser of the present invention with the bulk canister and lock neck devices installed and their lock gates open to admit pills from the canister, and the dispenser operating to dispense pills.
Figure 5B:
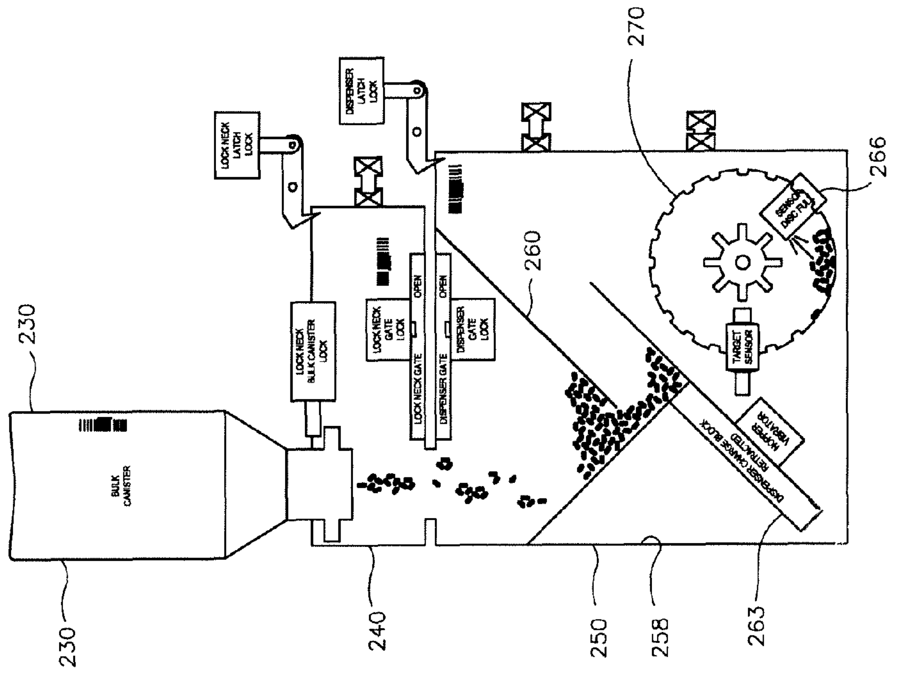
Figure 6B:
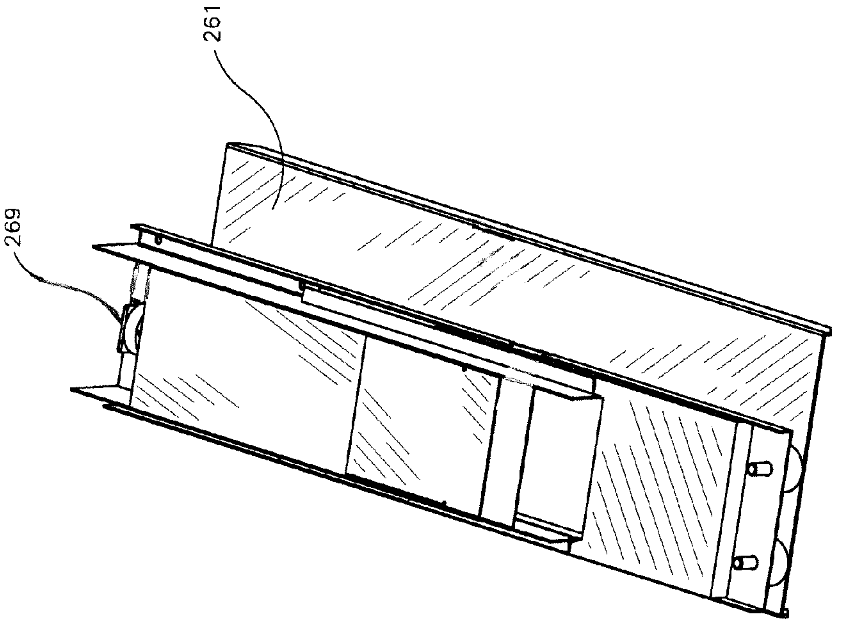
FIG. 6A-6D depict details of the charge block of the hopper.
Figure 6A:
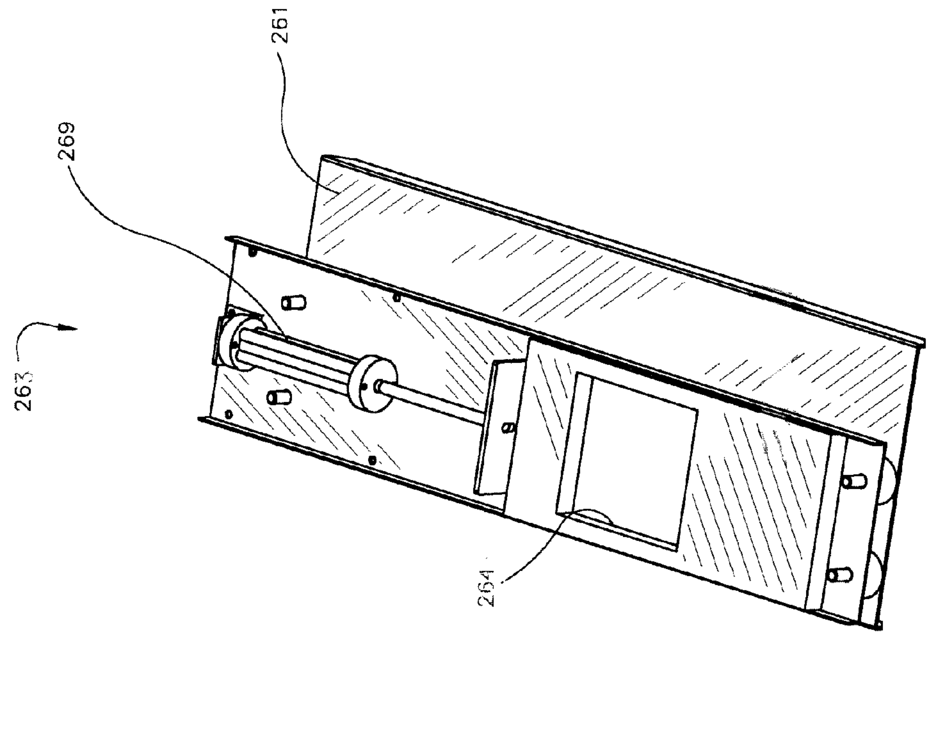
Figure 6D:
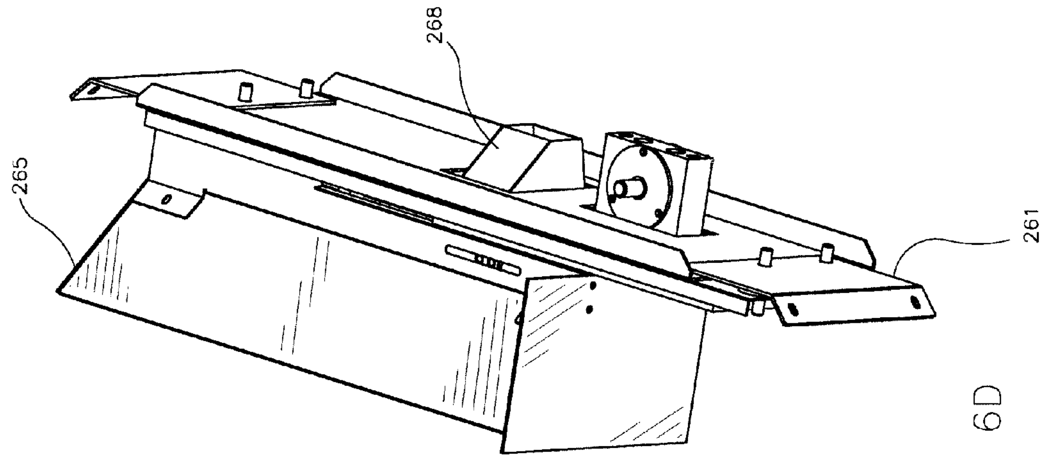
Figure 6C:
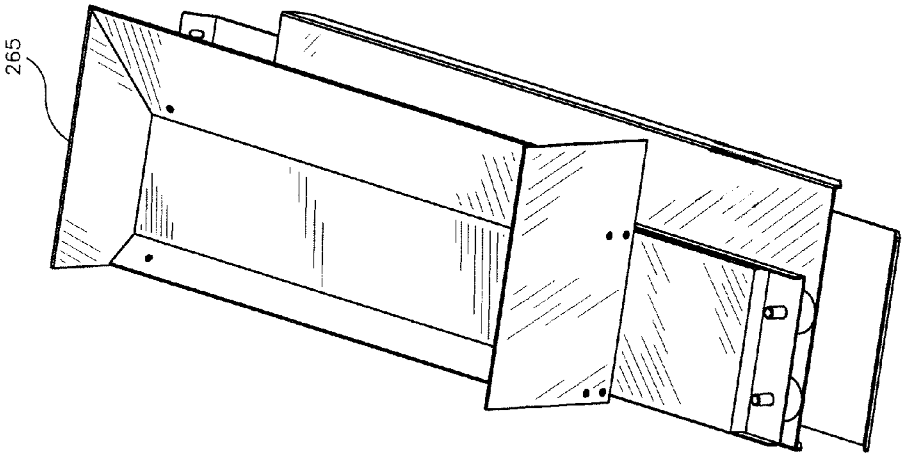

As best seen in FIGS. 5A, 5B, lock neck 240 comprises a substantially rectangular collar bearing canister port 247 closed at its upper end by bulk canister lock 241 and at its lower end by lock neck gate 242. Circular canister port 247 is adapted to receive canister neck 233, while neck lugs 234 cooperate with matching apertures and grooves within port 247 to affix canister 230 to lock neck 240 with a bayonet-like twisting motion. Once canister 230 is affixed, lock neck canister lock 241 (see FIG. 1) retains canister 230 to prevent it from being removed improperly, as discussed further below. Lock neck gate 242 interfaces with chassis 250 to dispense pills P into hopper 260 within chassis 250. Gate 242 remains securely closed and locked while lock neck 240 remains off of chassis 250. Gate 242 only may be opened only by controller C (not shown) and only once lock neck 240 is mounted atop chassis 250, as discussed in detail below. When lock neck 240 is properly installed atop chassis 250, gate 242 of lock neck 240 is positioned coaxial with dispenser gate 252, closed by dispenser gate lock 254, which then may be opened by controller C simultaneously with lock neck gate lock 243.

Disposed on a retractable tab on lock neck 240 (see FIGS. 2A, 2B), bar code 246 uniquely identifies lock neck 240 to controller C so that controller C may control gate 242 to dispense pills P from canister 230 into chassis 250. Upon installation of lock neck 240 to canister 230, the pharmacist scans bar codes 231, 246 on canister 230 and lock neck 240 respectively, and controller C associates them in a database of canisters 230 ready for use in bottle train BT. Canister 230 with lock neck 240 coupled thereto then is stored in a convenient, secure location (not shown) for later installation on a chassis 250 docked at a docking station (not shown) on bottle train BT.

When a given chassis 250 is ready for a supply of pills P, controller C issues instructions to transfer a canister 230, with lock neck 240 attached, for installation onto the chassis 250 which already is docked at its predetermined docking station (not shown). Once the pharmacist notifies controller C that lock neck 240 has been installed onto chassis 250, controller C exposes bar codes 246, 257 on lock neck 240 and chassis 250 respectively. By scanning bar codes 246, 257 and the docking station identifier (not shown), the pharmacist confirms that lock neck 240, with canister 230 attached, has been installed onto chassis 250 and is in place at the predetermined location assigned for pills P on bottle train BT. Once such association is achieved between bar codes 246 and 257 by the operator, controller C operates pneumatic switches 244, 259 to open lock neck gate 242 and dispenser gate 252 to admit pills P into chassis 250.

Continuing now with FIG. 1 and also with FIGS. 5A-5C, chassis 250 further includes within its interior 258 hopper 260 into which pills P drop when gates 242,252 open. At the bottom of hopper 260, charge block 263 closes the bottom of hopper 260 and articulates between a closed position (FIG. 9C) wherein it expels a quantum of pills P into counter 270, and an open position (FIGS. 9A, 9B) where it is recharged from hopper 260. Controller C operates dispenser charge block 263 to transfer said quantum of pills P into counter 270 for counting and dispensing pills P into bottles B.

As detailed in FIGS. 6A-6D, charge block 263 further comprises shield 265 coupling between hopper 260 and charge block 263 and adapted to direct pills P into selector chamber 264 disposed within charger block 263. Charge block 263 articulates by operation of actuator 269 between an open position (FIG. 6A) wherein it selects a quantum of pills P from hopper 260, and a closed position (FIG. 6B) wherein it discharges said selected quantum of pills P into counter 270 through funnel 268 (FIG. 6D. Selector chamber 264 is sized so that it can admit only a finite number of pills P from hopper 260 when charge block 263 is retracted into its open position, as shown in FIGS. 5A, 5B. When charge block 263 moves to its closed position, as in FIG. 5C, a measured number of pills P is expelled from selector 264 into counter 270. Charge block 263 then retracts to its original position (FIGS. 5A, 5B) to admit a like quantity of pills P and to await instructions from controller C to move them into counter 270. Charge block 263 so articulates in response to position changes from actuator 269 to which it is coupled and which causes it to slide vertically along plate 261 in response to commands from controller C. In this manner, controller C regulates the quantity of pills P entering counter 270 to prevent it from being overwhelmed by a sudden dispensing of a large quantity of pills P directly from canister 230 when gates 242, 252 are opened after a new canister 230 is installed atop chassis 250. Sensor 266 monitors counter 270 and notifies controller C when the level of pills P is getting low, whereupon controller C replenishes them, as described above.

Figure 7B:
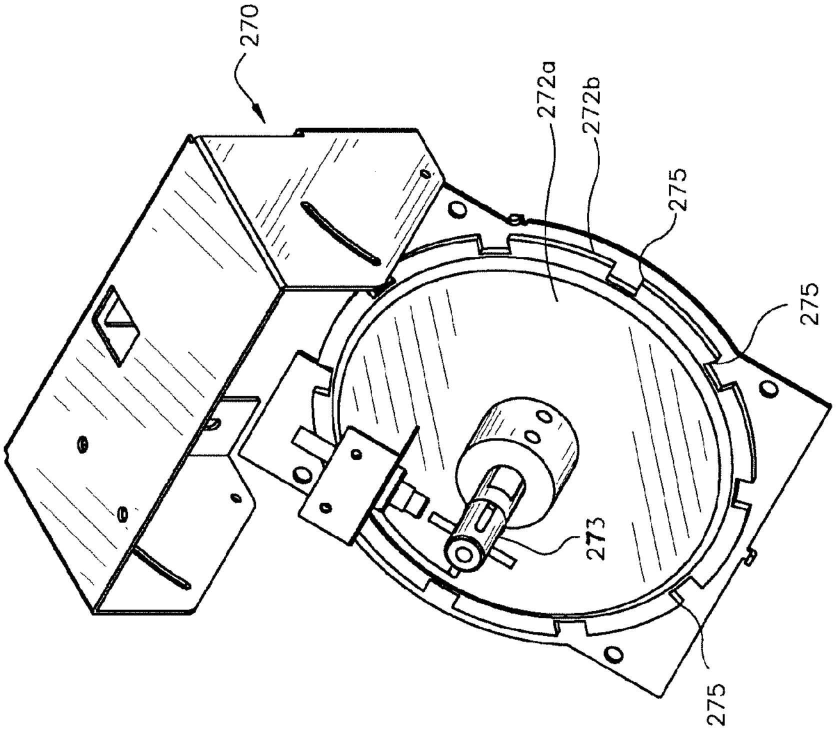
FIG. 7A-7B detail the pill counter used in the dispenser of the present invention.
Figure 7A:
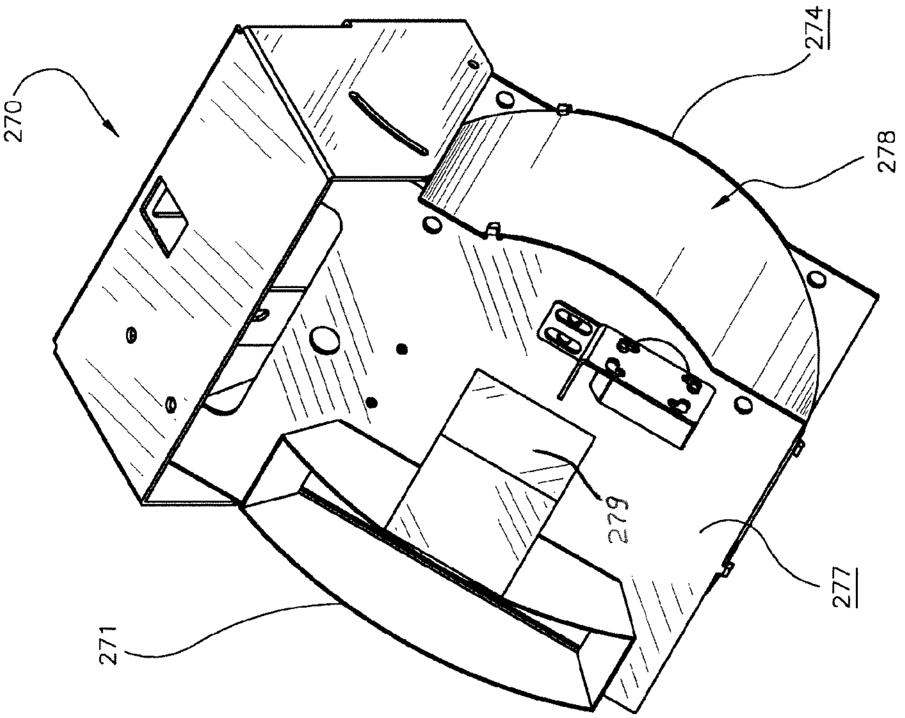

Turning now also to FIGS. 7A, 7B, pill counter 270 is positioned below funnel 268 (FIG. 6D) and adapted to catch pills P discharged therefrom. Chute 271 atop cover 277 directs pills P into silo 278 from hopper 260 by way of charge block 263 and funnel 268 as discussed above. Counter 270 comprises substantially circular silo 278 having cylindrical silo walls 274 coaxial with axle 273. Counter 270 is closed at its upper end by cover 277 and at its lower end by circular disk 272 coaxial with and forming the bottom of counter 270.

Silo 278 preferably is tilted preferably at approximately forty-five (45) degrees (plus or minus 25 degrees) to the horizontal to encourage pills P to pile up against the interior of silo walls 274. (See, e.g., FIG. 5C). Circular disk 272 rotates with axle 273 as step motor 279 turns it in angular increments about axle 273 in response to commands from controller C. As disk 272 rotates first one and then another of slots 275 (discussed in detail below) beneath this pile of pills P, gravity encourages pills P to migrate one at a time into one of slots 275, to be carried along the perimeter of disk 272.

Figure 8:
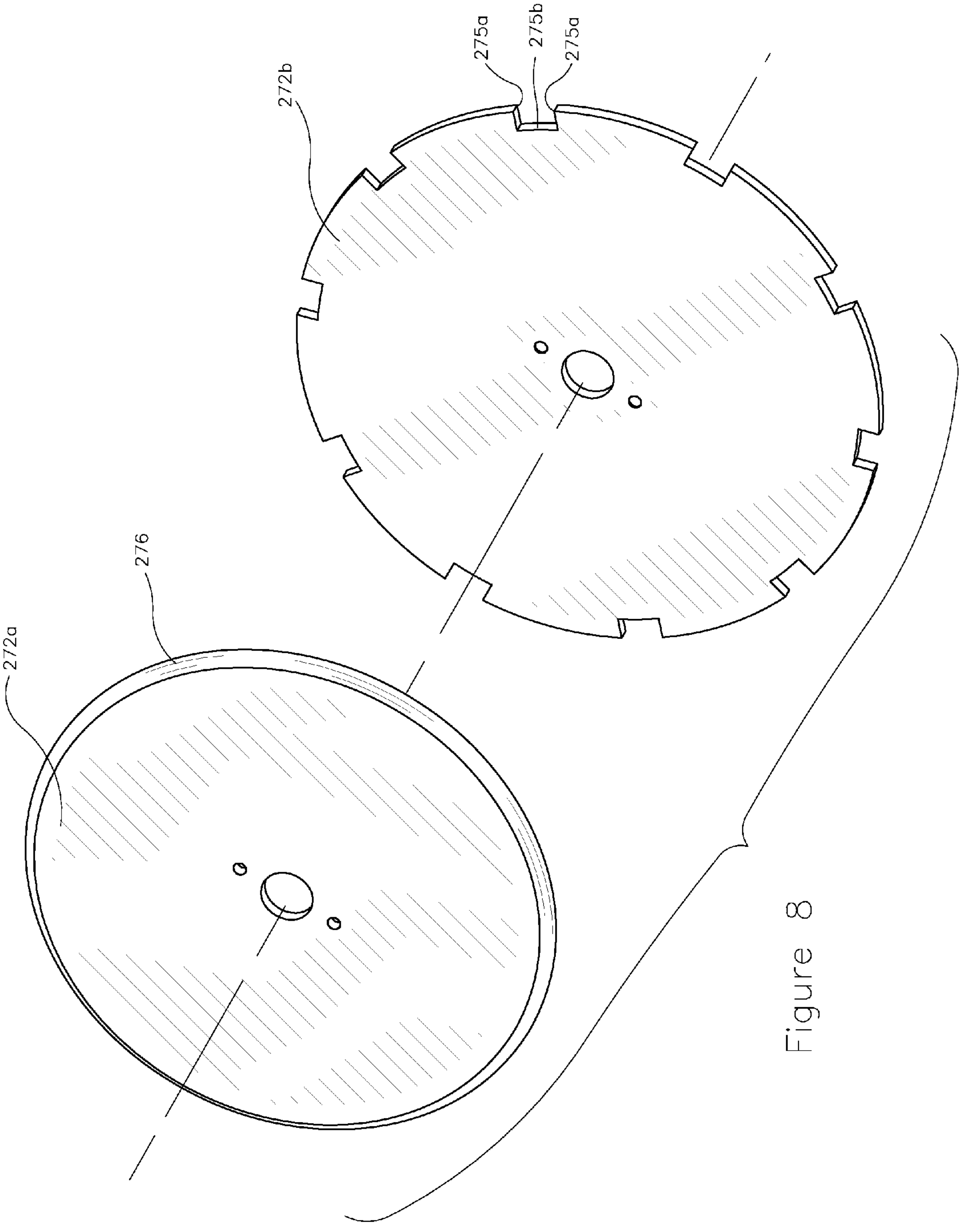
FIG. 8 details the slotted, rotating dispenser disk of the counter device of FIG. 8.

As best seen in FIGS. 7B and 8, disk 272 includes two parts. Upper plate 272*a* comprises a planar disk coaxial with and disposed atop lower plate 272*b*. Upper plate 272*a* has a slightly smaller diameter than lower plate 272*b* and a circumferential bevel 276 sloping from its upper surface, opposite lower plate 272*b* to terminate at or near slot back wall 275*b* (FIG. 8). Lower plate 272*b* is larger in diameter than upper plate 272*a* and terminates substantially juxtaposed to silo walls 274. Disposed at regular intervals around the perimeter of lower plate 272*b*, slots 275 are comprise two radial slot end walls 275*a* separated by a tangential slot back wall 275*b*. Back wall 275*b* is disposed substantially below the outer perimeter of bevel 276 of upper plate 272*a* and a spaced distance radially inward from and opposite silo wall 274. Slots 275 are sized according to the dimensions of pills P contained in canister 230 such that just one pill P may occupy slot 275.

Figure 9A:
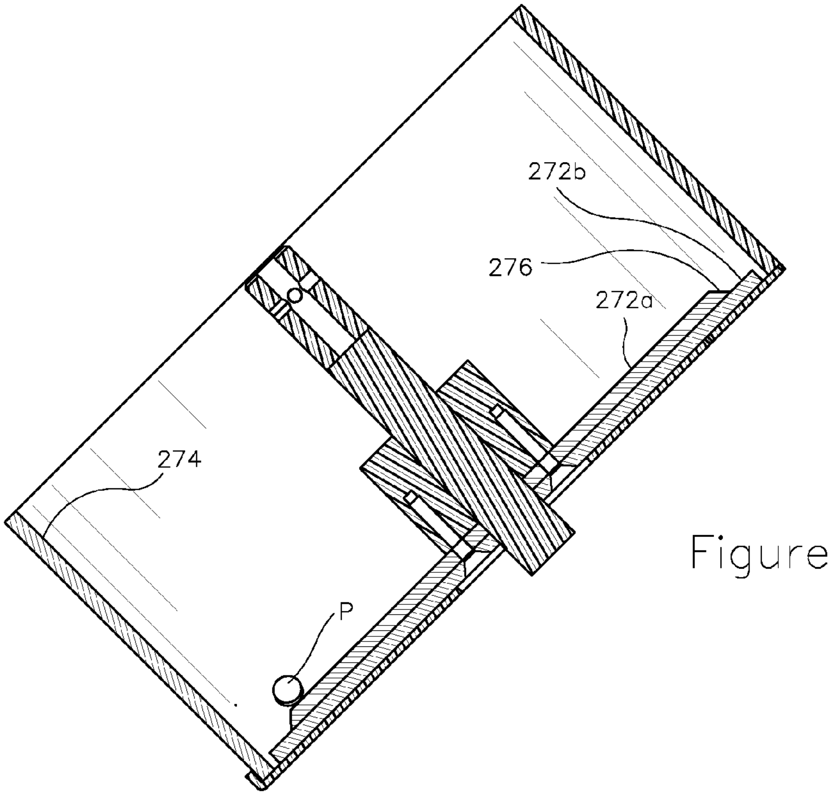
FIGS. 9A-9D show in elevational cross section the sequence of steps whereby a round pill migrates into a slot in the slotted disk of FIG. 8.
Figure 9B:
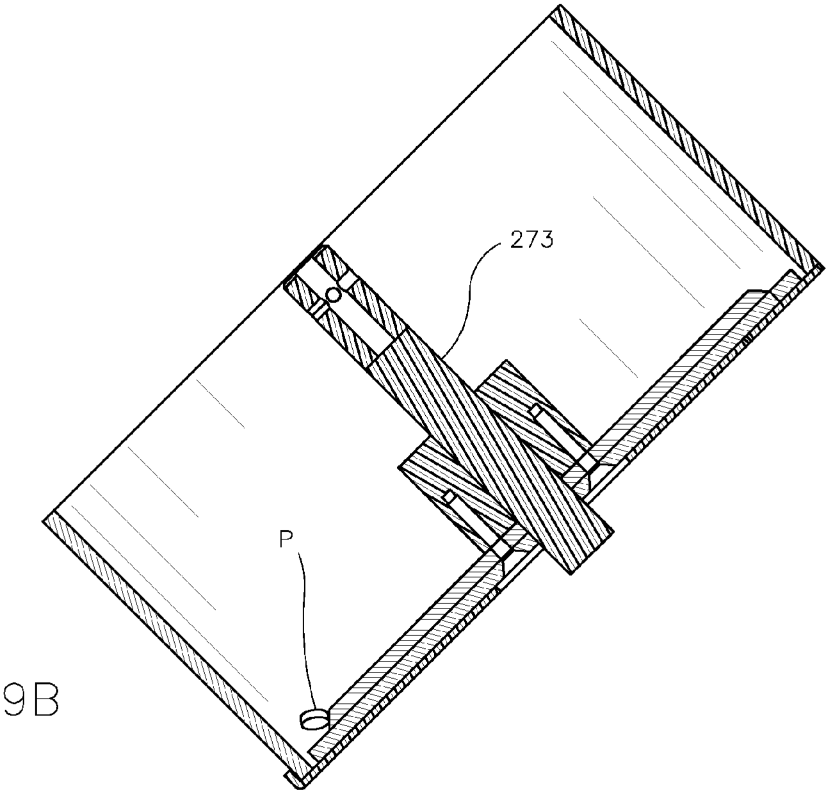
Figure 9C:
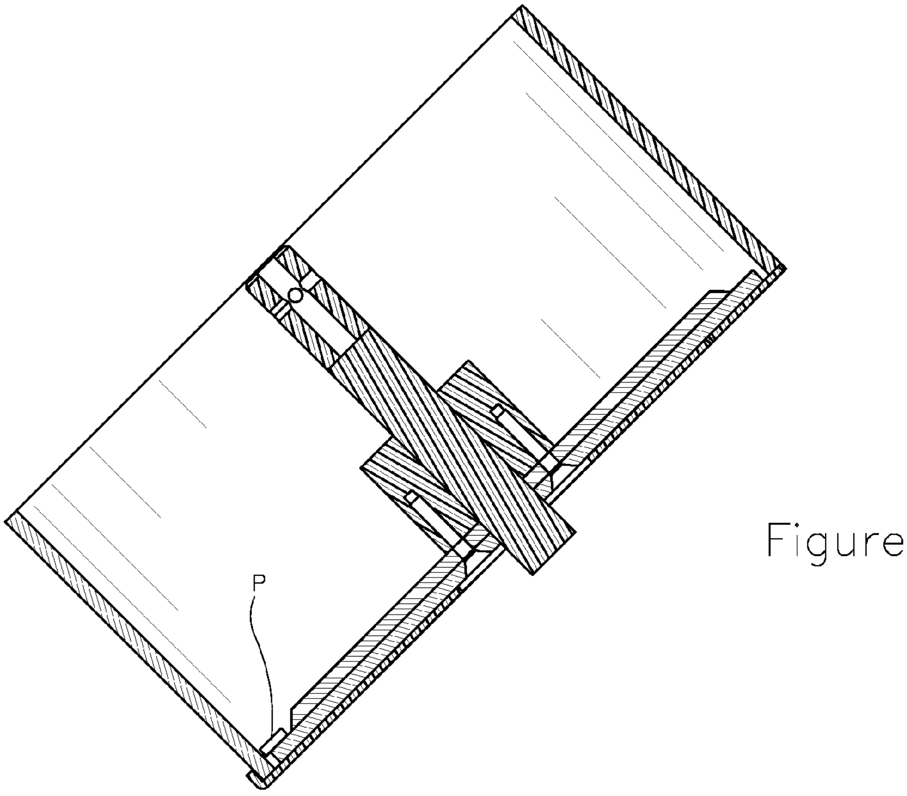
Figure 9D:
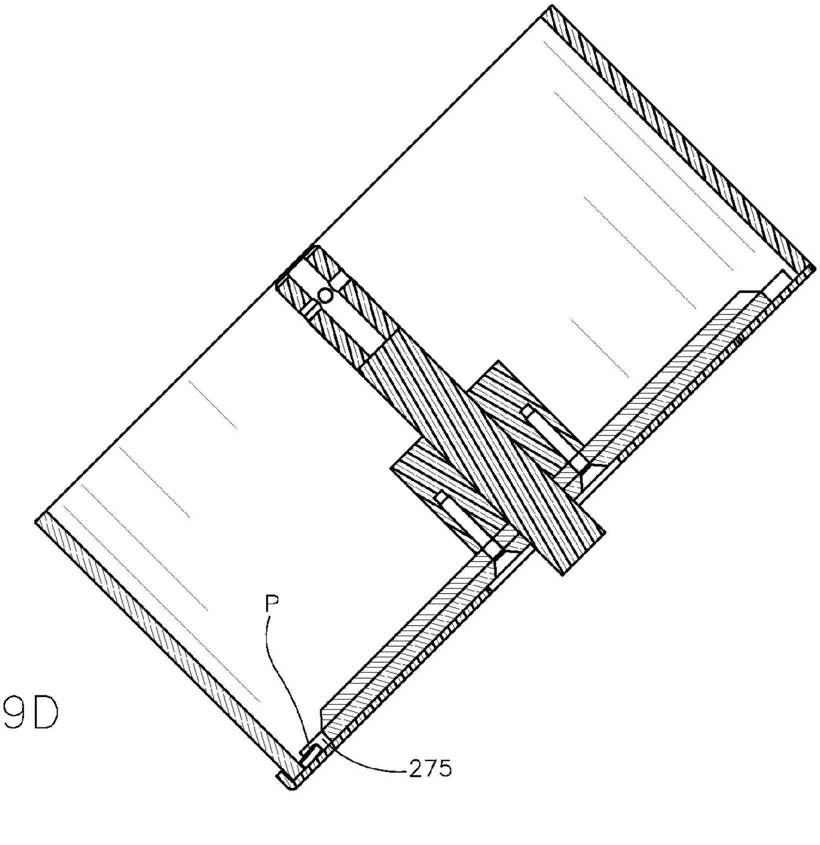
Figure 10A:
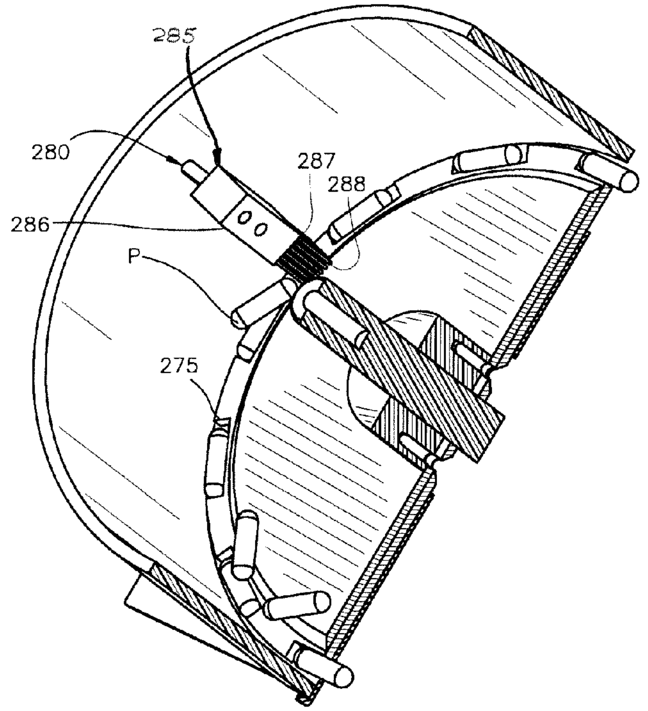
FIGS. 10A, 10B show in a perspective cutaway view a pill orientation means whereby elongate pills failing to occupy slots in the slotted disk of FIG. 8 are reoriented or removed.
Figure 10B:
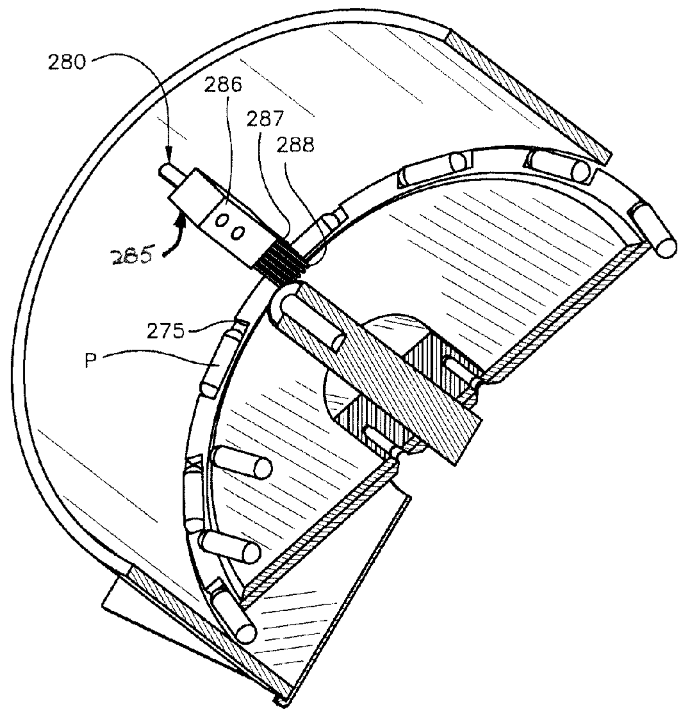
Figure 11A:
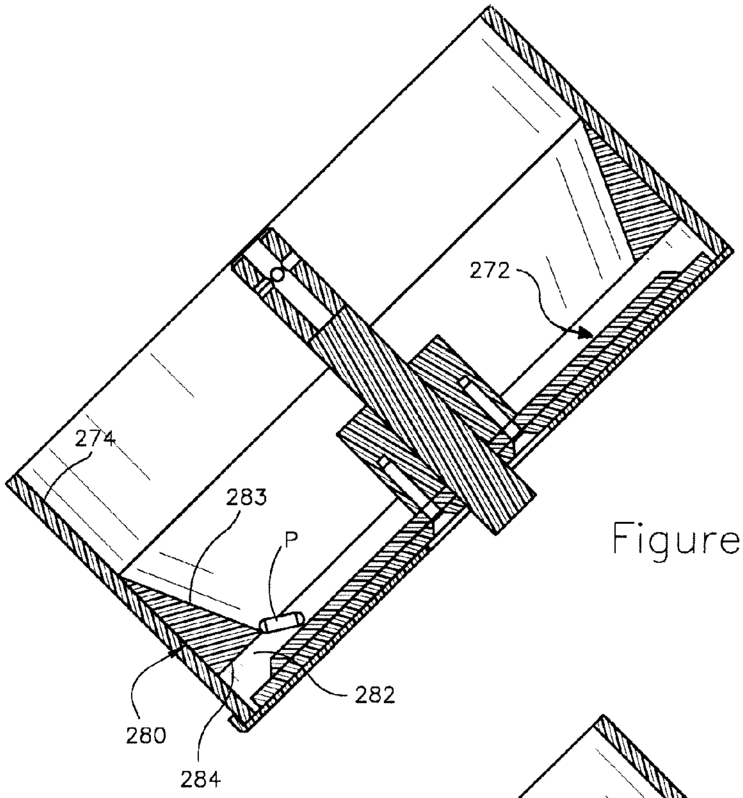
FIGS. 11A-11D show in elevational cross section an alternate embodiment of pill orientation means whereby an elongate pill or capsule is forced to migrate into a slot in the slotted disk of FIG. 8.
Figure 11B:
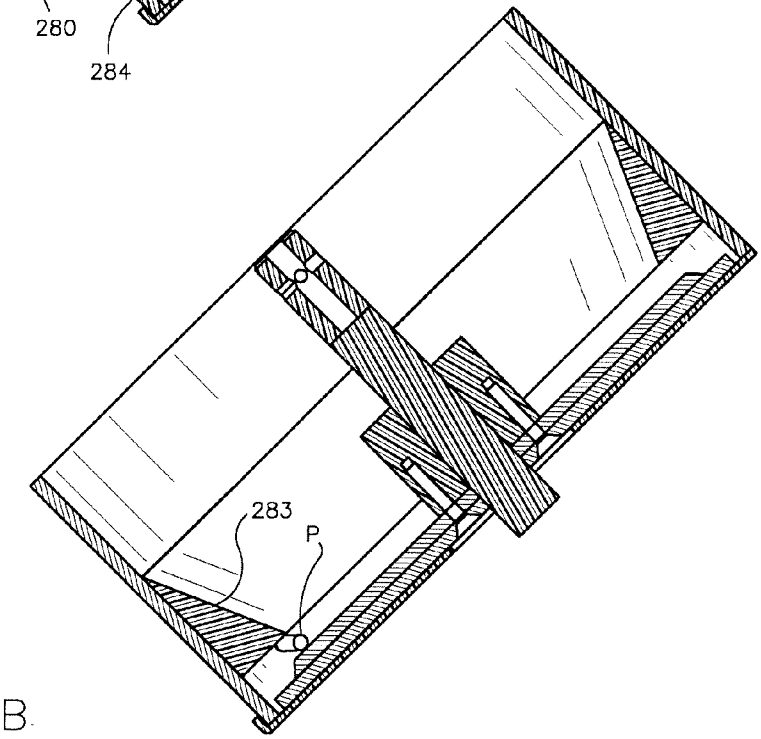
Figure 11C:
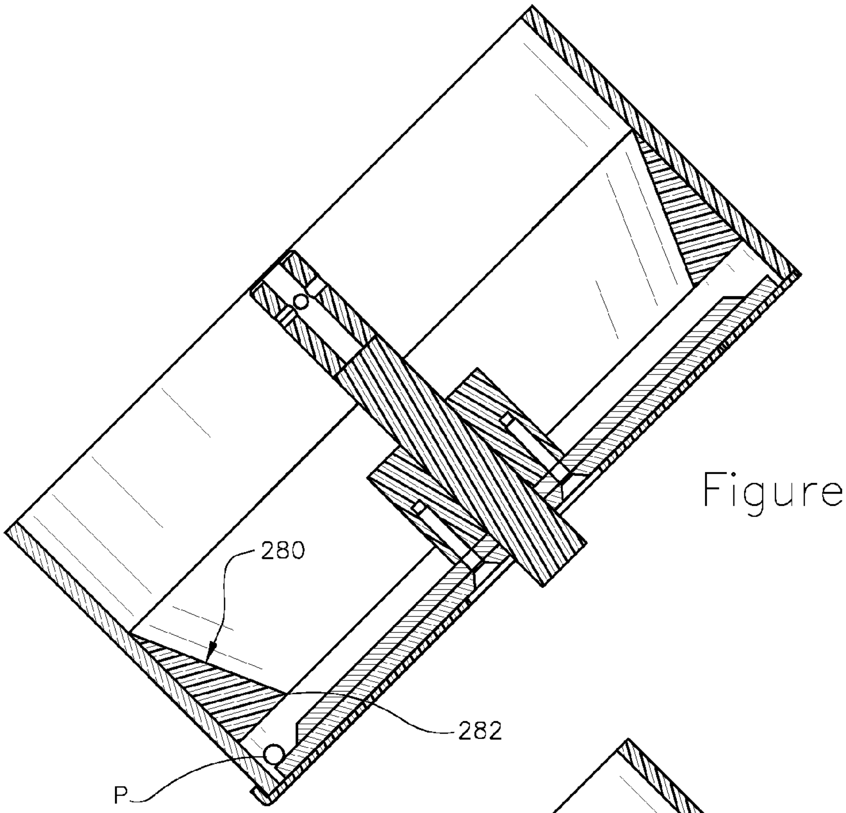
Figure 11D:
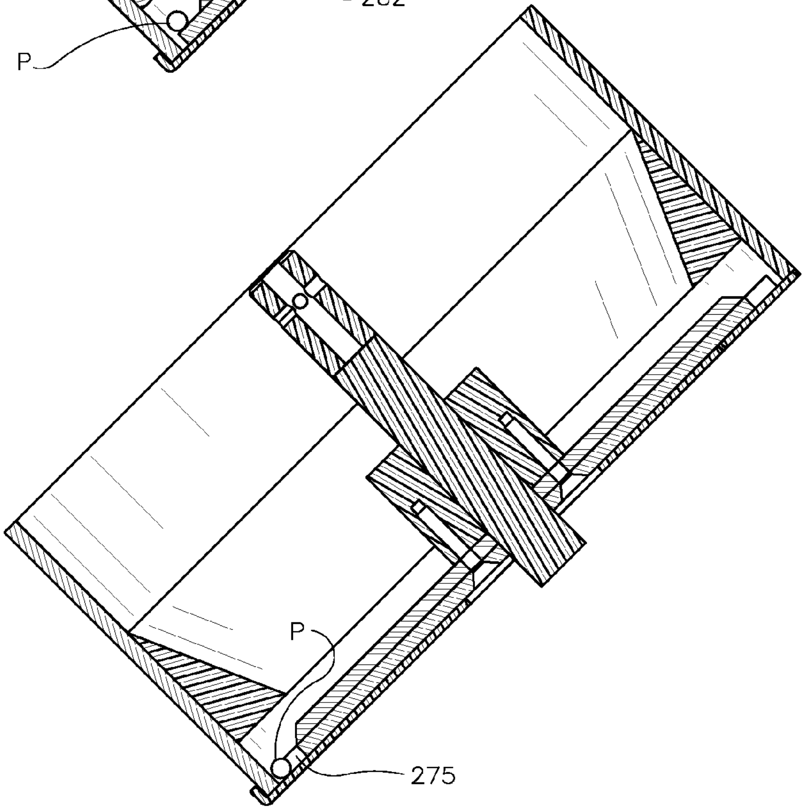
Figure 11E:
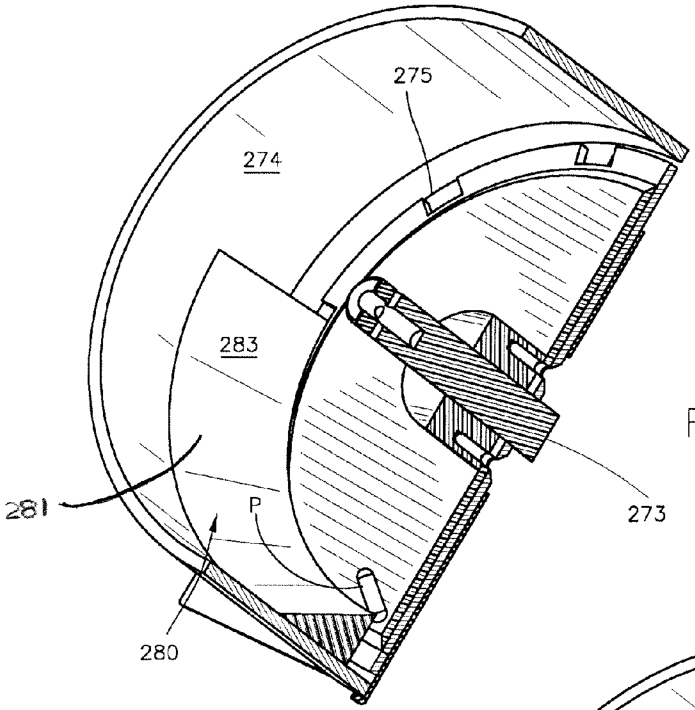
FIGS. 11E-11H detail from a perspective cutaway view the same sequence of pill orientation steps shown in FIGS. 11A-11D, better to show the shape of the pill counter walls.
Figure 11F:
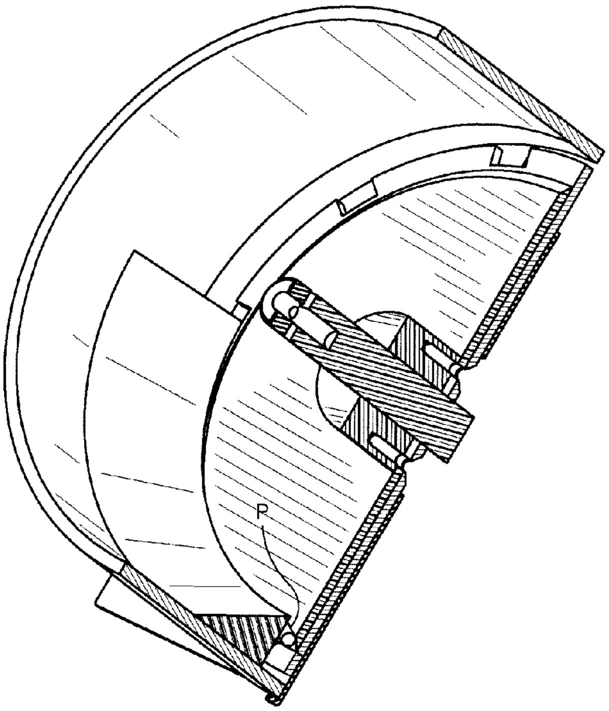
Figure 11G:
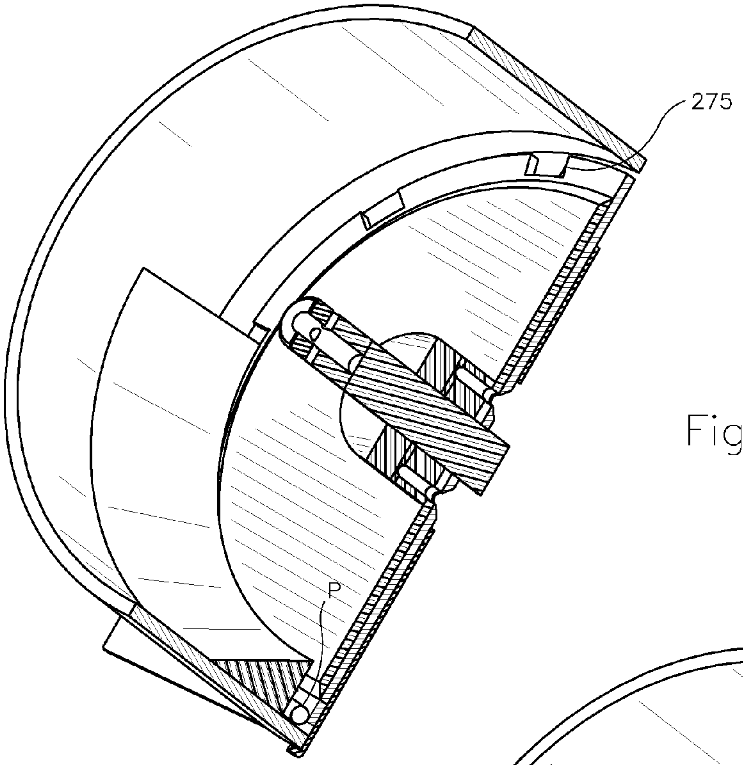
Figure 11H:
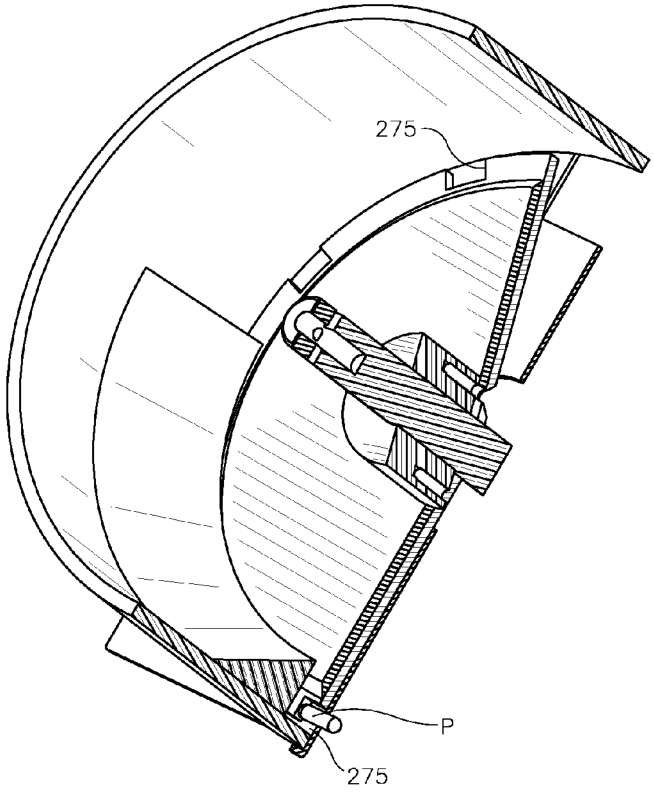

Referring also now to FIGS. 9A-9D, progression of a single pill P as described above is useful for understanding how the geometry of counter 270 must vary for oddly shaped pills. In FIG. 9A, pill P comprises a common shape of a regularly cylindrical tablet such as conventionally used for aspirin and ibuprofen (neither shown). Pill P may rest on one of its flat sides atop upper plate 272*a* of disk 272 within the pile (FIG. 5C) of other pills P waiting to be picked up by a slot 275. Slots 275 in turn are sized such that only a single pill P may fit between slot side walls 275*a* and between slot back wall 275*b* and silo walls 274. FIGS. 9A-9D illustrate the progress of pill P into slot 275. Gravity and radial acceleration of pill P from the rotation of disk 272 cause pill P to move radially outward along the surface of upper plate 272*a*. As pill P reaches bevel 276, it begins to tilt and eventually falls into slot 275 to rest against silo wall 274. Thus, pill P fills the space between slot side walls 275*a* and prevents another pill P from joining it in the same slot 275.

The foregoing discussion applies generally to all types of pills P, and works fine for round tablets. Of course, not all pills P are shaped alike, however. A different mechanism is required for irregularly shaped pills P such as oval or elongate, capsule-shaped pills P in which each pill P's length substantially exceeds its width. To assure an accurate count of such pills P, slots 275 still must be configured and oriented such that only one pill P per slot 275 can get through at a time.

For elongate slots for such elongate pills P, however, a conundrum arises. If slots 275 are sized for the narrow dimension of pill P, only those pills P standing on end can drop into slot 275. Further, since elongate pills P are less likely to stand on their ends than not, relatively few pills P are likely to drop into slot a 275, substantially lowering the efficiency of counter 270. Still further, pills P lying flat and spanning slots 275 sized to their smaller dimension could block slots 275 and prevent others from migrating into slot 275 anyway. Thus, it is important that slot 275 be as long as or slightly longer than the longest dimension of pill P, and only as wide as or slightly larger than the shortest dimension of pill P.

In the embodiment depicted in FIGS. 10A-11H, slots 275 are shaped to match pills P only when they are oriented tangential to plate 272. Slots 275 also are sized to be too shallow radially (i.e. the radial length of slot walls 275*a*) to admit more than one pill P so oriented, and only a single pill P can fall into slot 275. One having ordinary skill in the art will recognize that the tangential orientation of slots 275 is a matter of expediency, however, and that other orientations, such as with their longer dimension (defined by sides 275*b* in the figures) radial to walls 274, would work, too, and that all such orientations of slots 275 are considered to be within the spirit and scope of the present invention.

When plate 272*b* bears such elongate slots 275, however oriented, it is possible for two pills P standing side-by-side on their short-dimension (ends) to enter one slot 275, thus compromising dispensing accuracy. This conundrum is solved by providing pill orientation means 280 disposed on the inside of walls 274 of silo 278. A preferred embodiment thereof comprises brush means 285 disposed in at least one location around the perimeter of walls 274. Brush means 285 comprises rigid body 286 attached to walls 274 and equipped with limber bristles 287 extending normal to plate 272 to sweep their lower tips 288 across slots 275 as they pass by. Tips 288 reach to within a select distance above slots 275 such that pills P lying flat in slots 275 pass undisturbed, while pills P not fully within slots 275, e.g., lodged atop another pill P in slot 275 or standing upright on end, either will be swept into slot 275 to lie flat as desired, or dislodged altogether from lower plate 272*b* and returned to the pile of other pills P at the bottom of counter 270 to be captured by another slot 275.

As seen in FIGS. 11A-11H, and alternate embodiment of pill orientation means 280 adjusts the geometry of silo walls 274 to prevent elongate pills P from ever reaching slot 275 while stacked on atop another or standing on end. Scarp 281 comprises a substantially wedge-shaped flare extending radially inward from walls 274 to span the width of slots 275. Scarp 281 terminates radially inward from walls 274 in nose 282 disposed above upper plate 272*a* and spanning slots 275. Scarp 281 is poised above slots 275 a selected distance to create gap 284 sized slightly larger than the shorter dimension of pill P. Gap 284 allows any pill P lying flat, with its long side atop upper plate 272*a*, to progress radially outward, beneath nose 282 and down the incline of bevel 276 into slot 275, the remainder of pills P piling against surface 283 of scarp 281. This prevents any pills P other than those lying flat atop plate 272*a* from reaching bevel 276 and slots 275.

As best illustrated by FIG. 5C, as slots 275 advance around the perimeter of disk 272, pills P eventually reach a discharge aperture (not shown) through silo wall 274, which opens slot 275 such that pills P no longer are confined by walls 274 on the radially outward side of disk 272. Said discharge aperture is positioned at the point at which gravity urges pills P out of slot 275. Thus, pills P in turn escape slots 275 to fall through the discharge aperture at regularly spaced intervals to be caught in bottle B (FIG. 1).

Positioned at the outfall of the discharge aperture, sensor 255 (see FIG. 1) comprises fail-safe means for accuracy of dispenser 200 by serving to count pills P as they fall past it at regularly spaced intervals. One having ordinary skill in the art will recognize that controller C may be calibrated such that it anticipates that one pill P will be discharged into bottle B for every increment of disk 272. Thus, each incremental advance of disk 272 could be relied upon by controller C to count pills P into bottle B until the proper number of pills P has fallen into bottle B. It is entirely possible, however, that one or more slots 275 might pass beneath the pile of pills P at the bottom of silo 278 without acquiring a pill P. This could happen, for example, if pills P stick together or wedge between disk 272 and silo walls 274 and fail enter slot 275. This also could happen when hopper 260 runs out of pills P before a replenishing canister 230 has been installed onto chassis 250, as discussed above. To guard against this potential for an error in the count of pills P entering bottle B, sensor 266 provides a positive feedback loop to controller C to confirm the exact number of pills P actually to have fallen into bottle B, regardless of the incremental advance of disk 272.

Sensors 255 comprise electronic light sensing diodes of known configuration calibrated to sense light changes due to pills P as they pass. A suitable pill counting optical sensor 255 is available as part number RAL70 from Pepperl-Fuchs Gmbh company of Mannheim, Germany. A suitable pill level sensor 266 is available as part number BGS-S 15P from Optex, Inc. of Chino, Calif., USA, marketer of products from Optex Company Limited of Otsu, Japan. The step motor driving disk 272 is selected from a number of conventional type of servo-driven motors generally available and adapted to respond with incremental angular rotations of axle 273 in response to electrical impulses generated by controller C.

Controller C (not shown) actually comprises two levels carrying out two levels of activities. The first comprises an overall pharmacy management system (not shown), including software designed to operate a plurality of dispenser units 200. Such a management system comprises a micro-computer having a plurality of user interfaces such as a keyboard, mouse and monitor and coupled to and operate bottle train BT, including software to carry out overall system functions such as (a) apportioning pills P to a given location on bottle train BT (by monitoring the replenishment steps discussed above); (b) cataloging prescriptions and printing labels 2 for bottles B; (c) directing bottle B bearing bar codes 9 on labels 2 through bottle train BT to dispenser unit 200 for filling and then onward for packaging and shipping. A suitable controller C for a minimum level of pharmacy operations comprises a dual core microprocessor with 4.0 gigabytes (GB) of random access memory (RAM), at least 250 GB of permanent storage media such as a hard disk drive, and a video monitor having at least 1920 by 1200 pixel resolution. A suitable microprocessor is Core2 Duo E8400/3.0 gigahertz clock speed, with six megabytes of on-board cache, available from Intel Corporation of Santa Clara, Calif., USA.

Figure 12A:
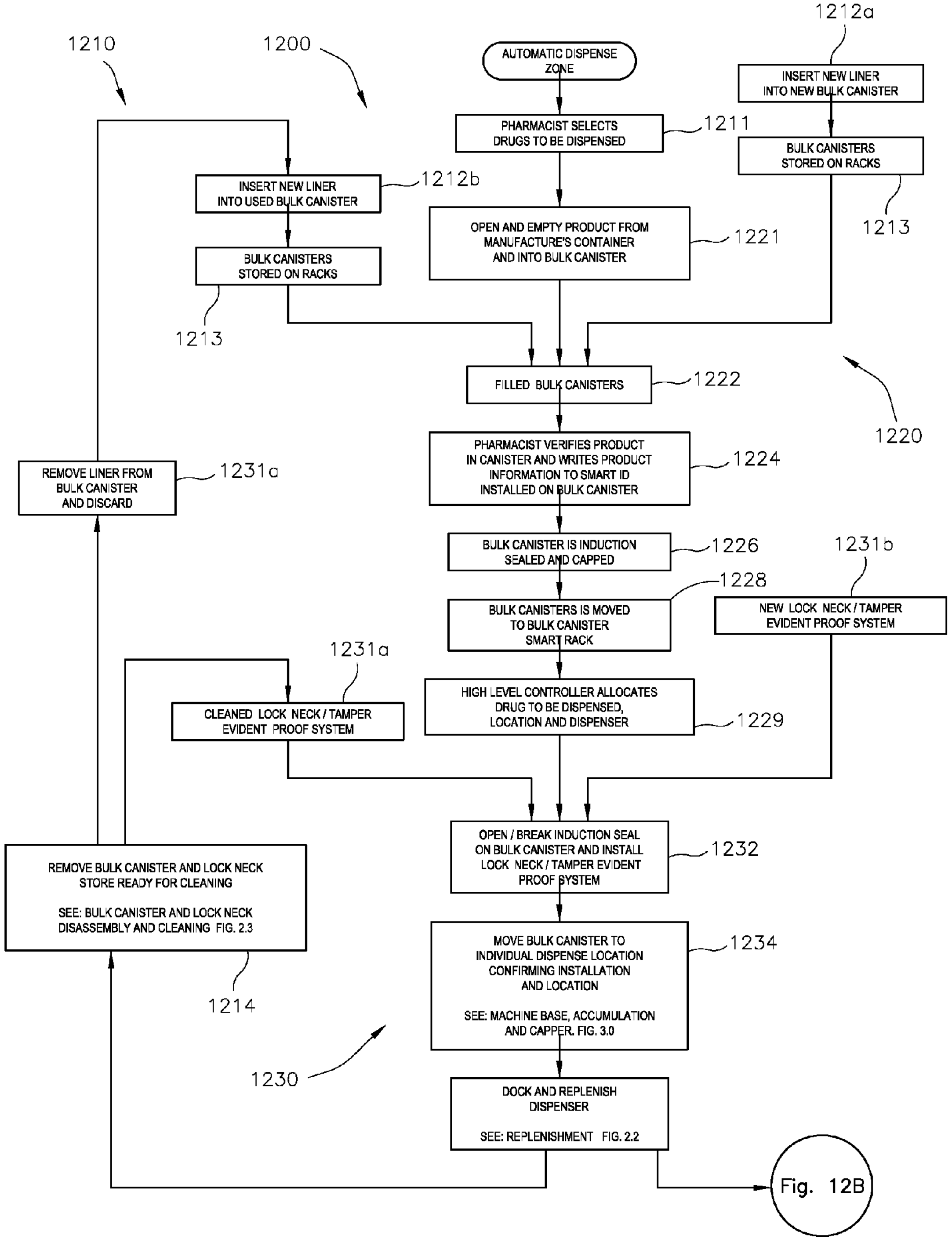
FIGS. 12A, 12B detail the steps by which bulk canisters are filled from manufacturers' pill containers, logged into the system and installed onto selected dispensers and readied to fill prescription bottles.
Figure 12B:
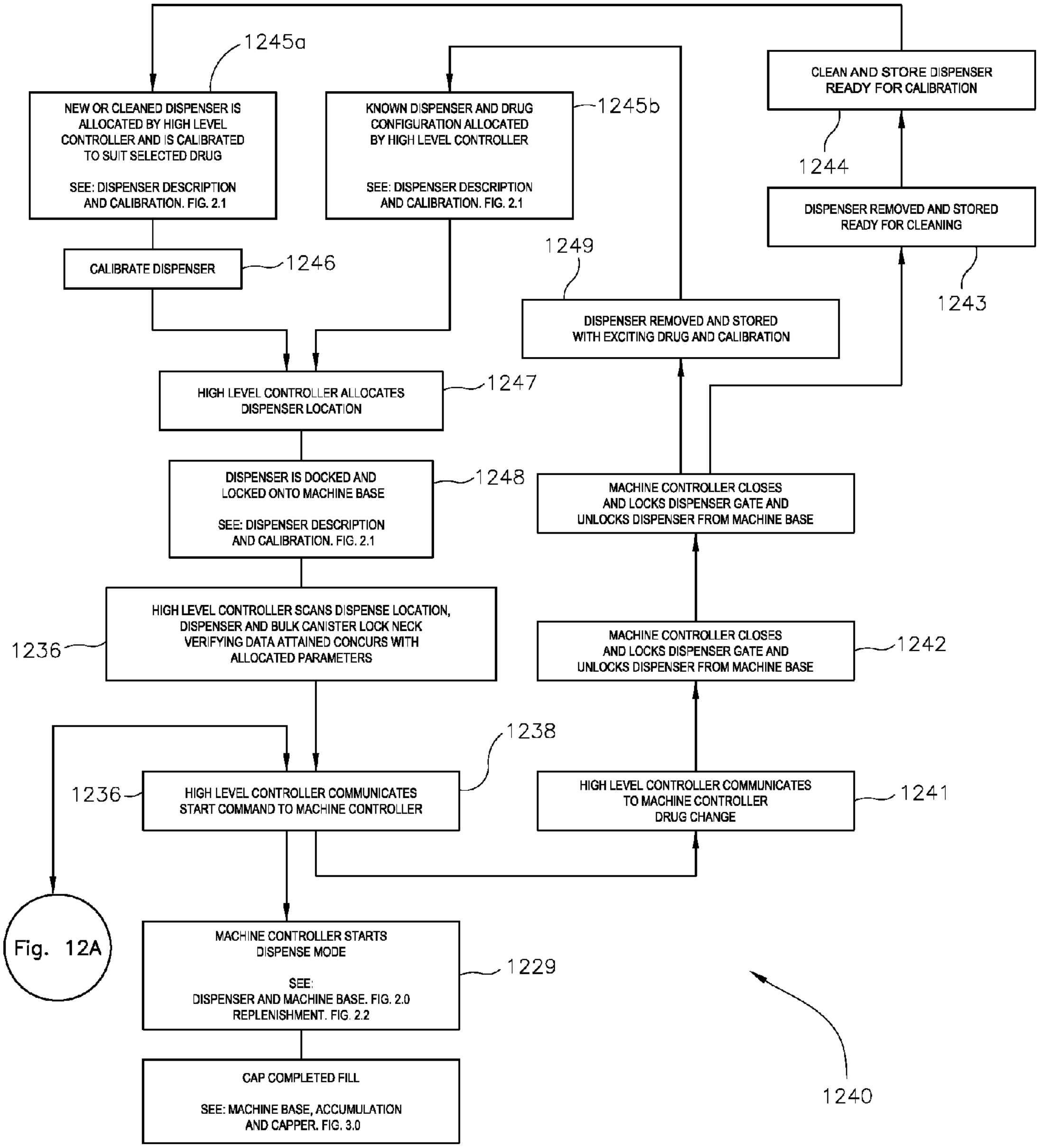

The second level of controller C comprises a programmable logic controller ("PLC") to which routine functions of at least one but preferably a plurality of dispenser units 200. Such PLC carries out the functions of (d) monitoring sensor 266 to determine when canister 230 needs to be replenished (FIGS. 12A, 12B and discussed in detail below); (d) operating charge block 263 to move a quantity of pills P from hopper 260 in response to indication from sensor 266 that the chamber of counter 270 is low on pills P; and (e) monitoring sensor 255 to confirm that the proper quantity of pills P actually has dropped into bottle B (FIG. 13 and discussion below), and reporting to the management system each of the foregoing steps so that the latter may retrieve bottle B and replace it with another.

In operation, a pharmacist (not shown) oversees the entire process 1200 (FIGS. 12A, 12B, 13) of handling of pills P from arrival from their respective manufacturers to dispensing into bottles B for filling individual prescriptions. To replenish a supply of pills P in a given dispenser 200, the pharmacist first selects 1211 them from among manufacturers' proprietary containers (not shown) in stock and then empties 1221 them into a canister 230 selected from among new and used empty bulk canisters 230 previously lined 1212*a*, 1212*b* to prevent contamination of pill stocks stored in them. Filled canisters 230 are sealed and capped 1226 and physically moved 1228 to a select rack indicating they have been logged 1224 into controller C, thereby associating a given type of pills P with a particular canister 230 bearing bar code 231. When pills P are needed for a particular dispenser 200, controller C then associates 1229 canister 230 with a particular chassis 250 bearing bar code 257 and issues an order to the pharmacist to begin the replenishment process 1230.

The pharmacist next places canister 230 on a flat surface such as a table and uncaps and breaks 1232 the sealing means 237A from mouth 237, thereby opening canister 230 to expose pills P. The pharmacist then installs 1232 lock neck 240 by inverting it, positioning it over mouth 237 and journaling neck 233 within port 247, rotating lock neck 240 until lugs 234 engage the grooves adapted to cooperate with them in port 247. The pharmacist then engages canister lock 241 to affix lock neck 240 to canister 230, and reads bar codes 231, 246 on canister 230 and lock neck 240 respectively, to associate one with the other for controller C. At this juncture, lock neck gate 242 remains closed and cannot be opened until controller C opens it after installation of the assembly onto the allocated chassis 250 to complete dispenser assembly 200. Thus, canister 230 with lock neck 240 locked in place, comprises a tamper proof package at least as secure as canister 230 alone closed by sealing means 237A.

Next, the pharmacist relocates canister 230, with lock neck 240 affixed thereto, to a selected chassis 250 for completion of dispenser assembly 200. The pharmacist inverts canister 230 and lock neck 240 and positions them atop chassis 250 with port 247 aligned with dispenser gate 252, and affixes the assembly in place with latch hook 245. At this time, both lock neck gate 242 and dispenser gate 252 remain closed and cannot be opened manually. Next, the pharmacist uses a bar code reader (not shown) to read bar codes 231, 246 and 257 to allocate canister 230 to chassis 250 and verifies 1236 that they belong together and that they have been locked together. Controller C confirms 1236 that pills P contained within cannister 230 indeed are the correct pills P it expected for dispenser assembly 200. This completes assembly of a dispenser unit 200. Then, it merely remains for the pharmacist physically to move 1243 dispenser assembly 200 to the allocated location on bottle train BT and again to verify 1236 using bar codes 231, 246 and 257 that the allocated dispenser 200 indeed has been located to its predetermined location.

This process also requires tracking dispensers 200 when they are not in service. Every time a dispenser 200 is reallocated to a new drug, it must be cleaned of debris and dust (not shown) from previous prescription pills P to prevent contamination of subsequent prescriptions. For practical purposes, it is more efficient to remove dispensers 200 to a cleaning location (not shown) and replace them with already cleaned dispensers 200. To this end, when controller C determines a drug change is needed, it first initiates 1241 the process 1240 by closing 1242 gate 252 and unlocking 1242 chassis 250 from bottle train BT. If canister 230 still contains a supply of pills P, the entire dispenser assembly 200, with canister 230 coupled to it through lock neck 240, simply will be removed and stored 1249 for future use, obviating the need to clean and re-calibrate it. It later will be reallocated 1245*b* for use elsewhere. If dispenser 200 does not retain a sufficient supply of pills P within its canister 230, or if none of that particular drug will be needed soon, chassis 250 is separated 1243 from lock neck 240, cleaned 1244 and reallocated 1245*a* and calibrated 1246 along with other new chassis 250 for use with a new drugs. In either case, when a new dispenser 200 assembly is needed, chassis 250 is mated with canister 230 then allocated 1247 to a given physical location in bottle train BT as discussed above where it will be docked and locked 1248 for filling 1229 bottles B with pills P.

Figure 13:
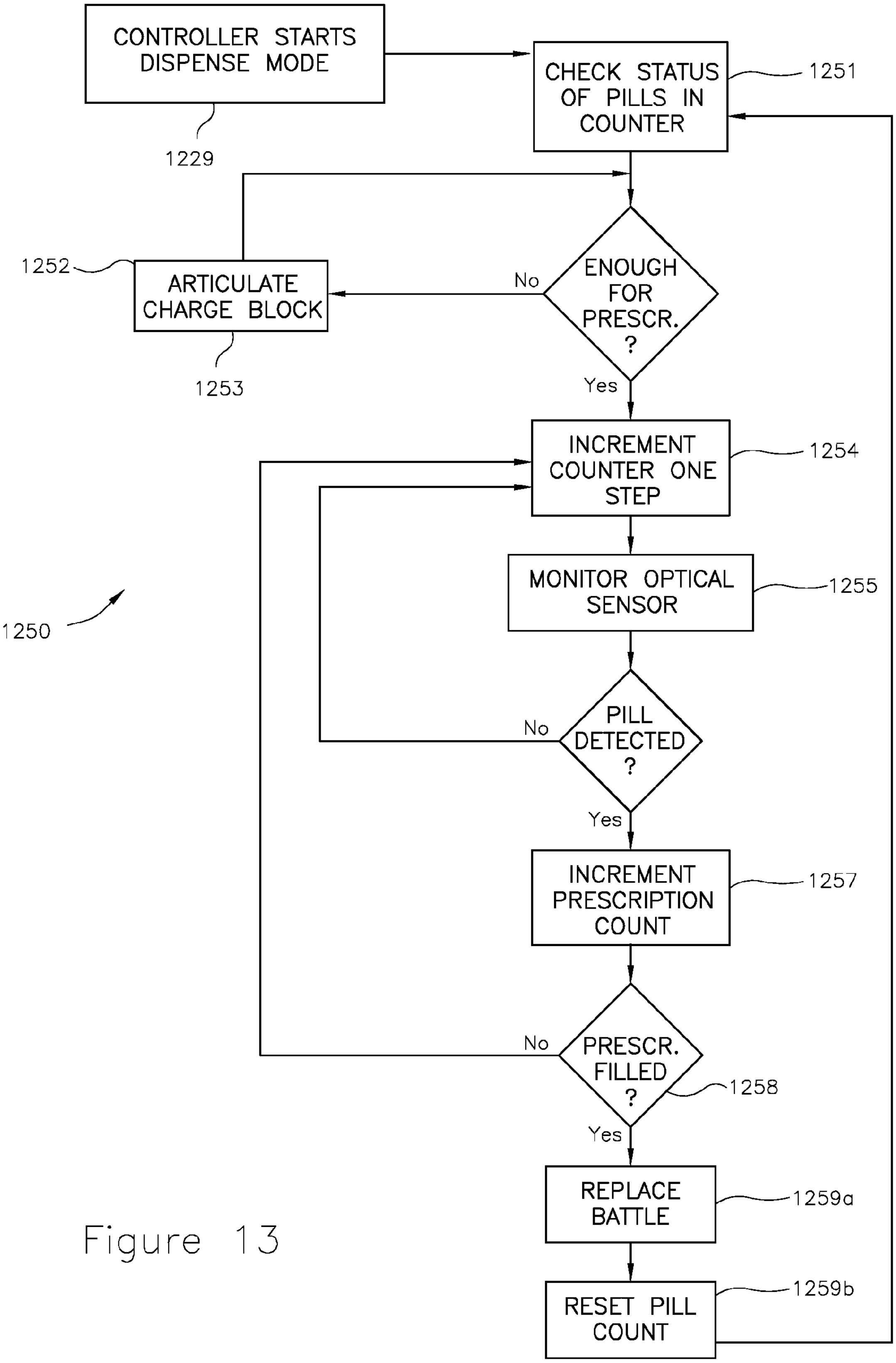
FIG. 13 details the steps in filling a prescription bottle.

Turning now to FIG. 13, the process 1250 by which bottle B is filled with pills P is illustrated. As mentioned above, controller C associates dispenser 200 with a particular physical location in the bottle train BT which moves each bottle B, associated with a particular prescription, to such physical locations beneath the discharge aperture of silo 278 for filling. Controller C next initiates 1229 the dispense mode for a giving bottle B by first checking 1251 the status of counter 270 to determine how many, if any, pills P remain therein. If this is insufficient, it operates 1252 charge block 263 to acquire a quantity of pills P from hopper 260 and then operates 1253 charge block 263 to move them into counter 270. Once controller C determines there are enough pills P in counter 270 to begin the filling process.

Controller C incrementally operates 1254 step motor 279 to rotate disk 272, continuing to articulate charge block 263 as needed to keep a sufficient supply of pills P in silo 278. As disk 272 moves pills P around its perimeter, controller C marks each stepped movement of disk 272 until the proper quantum of pills P ostensibly have been dispensed into bottle B. Controller C monitors 1255 sensor 255 to confirm 1256 that each pill P indeed dropped into bottle B as expected, and only then increments 1257 its count of pills P for bottle B. Thus, sensor 255 provides a feed-back loop to controller C to guard against under-filling of bottle B for its predetermined prescription because a slot 275 of counter 270 may have failed to pick up a pill P. When controller C confirms 1258 using sensor 255 that a predetermined number of pills P indeed have fallen into bottle B, it stops the filling operation for that bottle B, moves it from under silo 278 to replace 1259*a* it with a new bottle B, resets 1259*b* its pill P count and readies dispenser 200 for filling the next bottle B according to its predetermined prescription.

Dispenser 200 of the present invention, when used in conjunction with the above procedures, forms an integral part of the present invention which operates a plurality of dispensers 200 to fill many bottles B with different pills P as required for their respective predetermined prescriptions. Each dispenser 200 includes fail-safe means for preventing the wrong pills P from being dispensed into bottles B by relying upon a catalog of bar codes 231, 246 and 257 to assure a confirmed path between the contents of canisters 230 and each bottle B.

While the invention has been particularly shown and described with reference to preferred and alternate embodiments, it will be understood by those skilled in the art that various changes in form and detail may be made therein without departing from the spirit and scope of the invention. For example, counter 270 described above has been associated with the counting of pills P being spaced out for counting into bottles B for predetermined prescriptions. As mentioned above, counter 270 alternately could be employed to enumerate any number of small objects, such as screws, washers or the like in a hardware packaging context (assuming such precision is desired, of course), with appropriate dimensional adaptations (e.g. size and shape of slots 275) where needed.

I claim:

1. A small object dispenser for accurately counting and dispensing measured quantities of small objects into receptacles, the small objects having a lesser dimension and a greater dimension, the dispensing unit comprising:

a cabinet having an interior a hopper disposed in the interior;

a top disposed above the hopper and surrounding and defining an input port disposed above the hopper, the input port closed by an input gate; and an outfall port disposed below the hopper;

an object counter disposed between the hopper and the outfall port, the object counter having cylindrical chamber walls having an interior surface surrounding and defining a chamber having a chamber diameter;

plate means disposed coaxial with the chamber at one end thereof and forming a chamber floor;

a step motor coupled to an axle extending through the plate means coaxial with the chamber;

a chute disposed above the chamber and adapted to funnel the small objects from the hopper into the chamber;

recharge means removably coupled to the cabinet for recharging the hopper with small objects;

controller means adapted to operate the dispensing unit;

security means for securely tracking the small objects through the dispensing unit;

a canister adapted to contain a measured quantity of the small objects, the canister having a canister neck;

a lock neck coupled to the canister neck and having an upper surface and a lower surface;

a canister port extending through the lock neck from the upper surface to the lower surface thereof; and attachment means for attaching the lock neck to the canister;

an actuator-controlled lock neck gate disposed across the canister port at the lower surface and adapted to articulate between a closed position blocking the canister port and an open position whereby the lock neck removably seals the canister when the canister neck is attached within the canister port and the lock neck gate is in the closed position.

2. The dispensing unit according to claim 1 and further comprising:

object orientation means coupled to the plate means for orienting small objects to assure an accurate count thereof.

3. The dispensing unit according to claim 1 wherein the plate means comprises:

a circular lower plate coaxial with the chamber and having a lower plate circumference having a diameter substantially coextensive with the chamber diameter; and a plurality of slots walls disposed in pairs around the circumference of the lower plate and extending radially inward a select distance to terminate at a tangential slot back, each pair of slot walls and slot back defining an object slot adapted to receive a small object;

a circular upper plate disposed atop and coaxial with the lower plate and having a beveled upper plate circumference disposed substantially adjacent the object slots of the lower plate;

whereby the upper plate supports small objects introduced into the chamber and the beveled circumference of the upper plate urges the small objects one at a time into the lower plate object slots.

4. The dispensing unit according to claim 3 and further comprising:

a scarp disposed on the interior surface of the chamber walls a spaced distance above the upper plate corresponding to the lesser dimension of the small objects, the scarp extending radially inward toward the chamber axis to cover the object slots in the lower plate.

5. The dispensing unit according to claim 3 and further comprising:

a brush attached to the interior surface of the chamber walls; and bristles extending from the brush in normal relation to the upper plate and adapted to sweep excess small objects from the object slots in the lower plate as the plate means is rotated by the motor.

6. The dispensing unit according to claim 1 wherein the attachment means comprises:

a plurality of annular channels disposed within the canister port of the lock neck; and a plurality of lugs disposed on an outer surface of the canister neck and extending radially outward therefrom, the plurality of lugs corresponding in size, number and position to the plurality of annular channels within the annular port.

7. The dispensing unit according to claim 1 wherein the security means comprises:

a first bar code disposed on the canister to give the canister a unique canister identity;

a second bar code disposed on the lock neck to give the lock neck a unique lock neck identity;

a third bar code disposed on the cabinet to give the cabinet a unique cabinet identity;

a plurality of receptacle bar codes, each receptacle bar code disposed on one receptacle to give the receptacle a unique receptacle identity;

a first bar code reader adapted to (a) read the first and second bar codes and convey the canister and lock neck identities to the controller means; and (b) read the third bar code and convey the cabinet identity to the controller means;

a second bar code reader adapted to read each receptacle bar code and to convey the receptacle identity to the controller means;

whereby the controller means associates together the canister, lock neck and cabinet identities to define a small object identity for the dispensing unit, and whereby the controller means contrasts the receptacle identity with the small object identity of the dispensing unit to confirm that the small objects are to be dispensed into the receptacle before operating the dispensing unit to dispense the small objects.

8. The dispensing unit according to claim 7 and further comprising:

a circular plate coaxial with and coupled to the axle and adapted to be rotated by the step motor through a plurality of discrete angular, the plate having a circumference surrounding and defining a plurality of slots, each slot adapted to receive a small object;

a sensor disposed at the outfall port and adapted to sense each small object as it leaves the dispensing unit;

whereby the controller means (a) operates the step motor to rotate the circular plate and to incrementally urge a small object into the receptacle; and (b) monitors the sensor to record passage of each small object to determine and confirm the quantity of small objects urged into the receptacle.

9. The dispensing unit according to claim 1 wherein the security means comprises:

a dispensing unit identifier disposed on the cabinet;

at least one recharge means identifier disposed on the recharge means;

a receptacle identifier disposed on a plurality of receptacles; and identifier reading means for reading the dispensing unit identifier, the at least one recharge means identifier and the receptacle identifier and transmitting signals to the controller means whereby the controller means associates the cabinet, recharge means and receptacles together using their respective identifiers and records the number and type of small objects dispensed into the receptacle by the dispensing unit.

10. The dispensing unit according to claim 9 wherein:

the dispensing unit identifier, the at least one recharge means identifier and the receptacle identifier are bar codes; and the identifier reading means is a bar code reader.

* * * * *